US007099660B2

(12) United States Patent
Boehmke

(10) Patent No.: US 7,099,660 B2
(45) Date of Patent: Aug. 29, 2006

(54) SYSTEM, METHOD AND APPARATUS FOR A NETWORK-ORGANIZED REPOSITORY OF DATA

(75) Inventor: Yuergen Boehmke, Parkland, FL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 657 days.

(21) Appl. No.: 09/746,503

(22) Filed: Dec. 22, 2000

(65) Prior Publication Data

US 2002/0120638 A1    Aug. 29, 2002

(51) Int. Cl.
*H04Q 7/20* (2006.01)
*H04L 12/26* (2006.01)
*H04M 3/22* (2006.01)

(52) U.S. Cl. .................. 455/423; 379/32.01; 370/244; 709/213

(58) Field of Classification Search ................. 709/213; 455/423
See application file for complete search history.

(56) References Cited

U.S. PATENT DOCUMENTS

| | | | |
|---|---|---|---|
| 4,415,770 A | 11/1983 | Kai | |
| 4,819,162 A | 4/1989 | Webb | |
| 5,095,500 A | 3/1992 | Tayloe | |
| 5,216,612 A | 6/1993 | Cornett et al. | |
| 5,285,494 A | 2/1994 | Sprecher et al. | 379/59 |
| 5,297,193 A | 3/1994 | Bouix | |
| 5,412,758 A | 5/1995 | Srikanth | |
| 5,425,076 A | 6/1995 | Knippelmier | |
| 5,426,688 A | 6/1995 | Anand | 379/5 |
| 5,491,644 A | 2/1996 | Pickering et al. | |
| 5,530,861 A | 6/1996 | Diamant et al. | |
| 5,640,684 A | 6/1997 | Konosu | |
| 5,710,917 A | 1/1998 | Musa et al. | |
| 5,799,154 A | 8/1998 | Kuriyan | 709/223 |
| 5,826,252 A | 10/1998 | Wolters et al. | |
| 5,864,653 A * | 1/1999 | Tavallaei et al. | 714/2 |
| 5,867,558 A | 2/1999 | Swanson | |
| 5,892,442 A * | 4/1999 | Ozery | 340/539.14 |

(Continued)

OTHER PUBLICATIONS

V. Srinivasan and D.T. Chang, "Object Persistence in Object-Oriented Applications" IBM Systems Journal; V. 36, No. 1, 1997; retrieved from www.research.ibm.com/journal/sj/361/srinivasan.txt.*

(Continued)

*Primary Examiner*—B. James Peikari
(74) *Attorney, Agent, or Firm*—Withers & Keys, LLC

(57) ABSTRACT

A system, method and apparatus is disclosed for providing real-time access to a network organized repository of data. The system includes a computing system including one or more computers having one or more processors for executing a first set of program instructions and a first memory for storing the first set of program instructions; and a server, in communication with the computing system, the server having one or more processors for executing a second set of program instructions and a second memory for storing the second set of program instructions, the server being configured to support one or more users and to provide shared access to one or more telecommunication computer software programs, the server being coupled to one or more resources for managing, communicating and the storing data and the computer software programs. The method provides real-time access to the network organized repository of data by providing access to the telecommunication computer software programs to a computer and communicating to the server with the computing system and providing the user of the computer with real-time access to the data and the telecommunication programs and any changes made thereto. The apparatus provides a computer readable medium having a set of computer instructions encoded thereon.

29 Claims, 11 Drawing Sheets

U.S. PATENT DOCUMENTS

| | | |
|---|---|---|
| 5,905,988 A | 5/1999 | Schwartz et al. |
| 5,940,471 A | 8/1999 | Homayoun |
| 6,008,808 A | 12/1999 | Almeida |
| 6,012,067 A * | 1/2000 | Sarkar .................... 707/103 R |
| 6,016,340 A | 1/2000 | Bayraktar ................... 379/114 |
| 6,018,567 A | 1/2000 | Dulman ........................ 379/34 |
| 6,108,536 A | 8/2000 | Yafuso |
| 6,111,857 A | 8/2000 | Soliman |
| 6,131,031 A | 10/2000 | Lober et al. |
| 6,137,862 A | 10/2000 | Atkinson |
| 6,141,565 A | 10/2000 | Feuerstein et al. |
| H1921 H * | 11/2000 | Fletcher et al. ............. 455/433 |
| 6,181,776 B1 | 1/2001 | Crossley |
| 6,212,260 B1 | 4/2001 | Baum et al. ................... 379/38 |
| 6,233,313 B1 | 5/2001 | Farris et al. ................... 379/34 |
| 6,282,514 B1 | 8/2001 | Kumashiro |
| 6,330,312 B1 | 12/2001 | Wright et al. .......... 379/112.06 |
| 6,336,035 B1 | 1/2002 | Somoza et al. |
| 6,347,217 B1 | 2/2002 | Bengtsson et al. |
| 6,356,758 B1 | 3/2002 | Almeida et al. |
| 6,366,609 B1 * | 4/2002 | Rossi ......................... 375/222 |
| 6,393,419 B1 | 5/2002 | Novak |
| 6,408,304 B1 | 6/2002 | Kumhyr ..................... 707/102 |
| 6,411,969 B1 | 6/2002 | Tam |
| 6,445,916 B1 | 9/2002 | Rahman ..................... 455/423 |
| 6,504,907 B1 | 1/2003 | Farris et al. ................... 379/35 |
| 6,512,916 B1 | 1/2003 | Forbes, Jr. |
| 6,519,452 B1 | 2/2003 | Agostino et al. ........... 455/423 |
| 6,539,082 B1 | 3/2003 | Lowe et al. ........... 379/114.28 |
| 6,571,279 B1 | 5/2003 | Herz et al. |
| 6,574,464 B1 | 6/2003 | Chen |
| 6,609,100 B1 | 8/2003 | Smith et al. |
| 6,684,212 B1 | 1/2004 | Day et al. |
| 6,707,472 B1 | 3/2004 | Grauman |
| 6,725,032 B1 | 4/2004 | Sheridan et al. |
| 6,763,250 B1 | 7/2004 | Forbes, Jr. |
| 6,792,269 B1 | 9/2004 | Boehmke |
| 6,829,491 B1 | 12/2004 | Yea et al. |
| 2001/0032170 A1 | 10/2001 | Sheth ........................... 705/37 |
| 2001/0032263 A1 | 10/2001 | Gopal |
| 2001/0036825 A1 | 11/2001 | Martin ....................... 453/424 |
| 2001/0046230 A1 | 11/2001 | Rojas ......................... 370/389 |
| 2001/0051890 A1 | 12/2001 | Burgess ......................... 705/9 |
| 2002/0067810 A1 | 6/2002 | Barak et al. ............. 379/88.25 |
| 2002/0072358 A1 | 6/2002 | Schneider et al. .......... 455/423 |
| 2002/0119771 A1* | 8/2002 | Boehmke et al. ........... 455/423 |
| 2002/0119786 A1* | 8/2002 | Boehmke .................... 455/455 |
| 2002/0120765 A1* | 8/2002 | Boehmke .................... 709/231 |
| 2002/0123339 A1* | 9/2002 | Boehmke .................... 455/424 |
| 2002/0126822 A1* | 9/2002 | Boehmke et al. ...... 379/221.03 |
| 2002/0147668 A1 | 10/2002 | Smith et al. .................. 705/30 |
| 2003/0086549 A1* | 5/2003 | Boehmke ............... 379/201.05 |

OTHER PUBLICATIONS

Borland Paradox for Windows-User Guide, 1994, Avery Dension, pp. 21 and 175-177.
U.S. Appl. No. 09/963,151 (Boehmke) Sep. 24, 2001.
U.S. Appl. No. 09/955,401 (Boehmke) Sep. 12, 2001.
U.S. Appl. No. 09/962,423 (Boehmke) Sep. 24, 2001.
U.S. Appl. No. 09/963,152 (Boehmke) Sep. 24, 2001.
U.S. Appl. No. 09/961,510 (Boehmke) Sep. 24, 2001.

* cited by examiner

SYSTEM, METHOD AND APPARATUS FOR A NETWORK-ORGANIZED REPOSITORY OF DATA

STATEMENT REGARDING FEDERALLY SPONSORED RESEARCH AND DEVELOPMENT

Not Applicable.

BACKGROUND

1. Technical Field

The system, method and apparatus relate generally to telecommunications. More particularly, the system, method and apparatus relate to providing real-time access to a network-organized repository of data and processes within a distributed data and processes information system.

2. Description of Related Art

Related art systems provide data and processes, such as computer software programs, in multiple databases, spreadsheets and other files that are not interrelated, interconnected or in communication with each other. Accordingly, users of such data and processes on a distributed network are unable to execute the software programs and access the data on a real-time basis. For example, such users are unable to access modifications to the data or upgrades to the software programs. Furthermore, such users are unable to access changes to data which may have an effect on the user's function or processes made by others, on a real-time basis. There are no known related art systems that provide real-time access to a network-organized repository of data and processes, such as software programs, within a distributed data and processes information system.

Telecommunication systems generally employ switches that establish and release connections between two or more communication circuits. Generally, a control processor is utilized to control the operation of one or more telecommunication switches in a given geographic region. The control processor may be utilized to control the operation of one or more digital cellular switches deployed in a particular telecommunication system in a given city. Different geographic regions can generally deploy one or more telecommunication switches that are in turn controlled by a telecommunication switch control processor.

Failures that occur during a telecommunication transaction can be tracked by generating a failure message at the telecommunication switch control processor. Such failure messages generated at the telecommunication switch control processor are referred to as call processing failures occurring at the telecommunication switch control processor.

In general, related art systems provide reports of such call processing failures occurring at the telecommunication switch control processor. The reports are useful to a telecommunication system performance evaluation team for purposes of evaluating the overall operation of the telecommunication system. In accordance with the reports, the performance evaluation team will generally take remedial actions based on an analysis of the cell processing the failure data. However, in related art telecommunication systems, such reports are normally available only for the previous day and are not available substantially concurrently with the occurrence of a failure. There are no known systems that allow a telecommunication system performance evaluation team to receive and evaluate reports of call processing failures occurring at the telephone switch control processor on a real-time basis. Accordingly, the performance evaluation team cannot take the necessary remedial action in response to the call processing failure on a real-time basis.

Failures that occur during a telecommunication transaction can also be tracked by generating a failure message at the digital cellular switch. Such failure messages generated at the digital cellular switch are referred to as call processing failures occurring at the digital cellular switch.

In general, related art systems provide such digital cellular switch failure reports. The reports are useful to a telecommunication system performance evaluation team for purposes of evaluating the overall operation of the telecommunication system. In accordance with the reports, the performance evaluation team will generally take remedial actions based on an analysis of the call processing failure data. However, in related art telecommunication systems, such reports are normally available only for the previous day and are not available substantially concurrently with the occurrence of a failure. There are no known systems that allow a telecommunication system performance evaluation team to evaluate reports of call processing failures occurring at the digital cellular switch on a real-time basis. Accordingly, the performance evaluation team cannot take the necessary remedial action in response to the call processing failure on a real-time basis.

Telecommunication transaction records (call records) generally are collected from mobile telephone subscribers and used for various purposes. For example, the call records can be used for billing purposes, for tracking illegal activity, for troubleshooting the telecommunication system and the like. Related art methods and systems can obtain call records through either the billing system or by searching through every telecommunication switch on the system.

Searching for telephone call records in the billing system has several drawbacks. One drawback of such a system is that it could take days or weeks to obtain the call records.

Another related art method and system obtains the call records by searching within every telecommunication switch throughout the telecommunication system. The drawback with searching the switches for call records is that a user must perform the searching function at every existing switch. Accordingly, it may take up to 2–4 hours or more in order to obtain a complete set of call records at the central office. Another drawback of searching at every telecommunication switch location is that telephone call records are available at the switch insofar as there is adequate disk storage available at the switch. For example, generally, a switch only holds 3 to 4 days' worth of call records in its storage disk. Any call record older than 3 to 4 days would generally not be available to the user.

There are no known related art systems that can provide telephone call records on a real-time basis. For example, there are no known methods or systems that collect all incoming call records in real-time from mobile telecommunication devices of various subscribers of the telecommunication system. Furthermore, there are no known related art systems or methods that make the call records available to a user in real-time. As an example, real-time means substantially concurrently with the telecommunication device hanging up. In general, within 10–15 seconds of the telecommunication device hanging up, the call records become available for the user to review and manipulate. In addition, there are no known related art systems or methods that store the call records for longer than about 3 to 5 days.

Related art telecommunication methods and systems for collecting and communicating court-ordered requests of call records were found to be undependable. Such methods and systems collect transactional call records requested by court order and a telecommunication switch sends the call records to an agency that is responsible for managing and processing the court orders. However, if any problems are encountered within the telecommunication system, the call records are lost and cannot be communicated to the responsible agency.

There are no known methods or systems that filter incoming call records from a call record database associated with a court order and automatically communicate those call records, either by way of electronic mail (e-mail) message or by way of facsimile transmission, to the agency responsible for generating the court-ordered request. Also, there are no known methods or systems that make the call records available even if the court-ordered request is generated after the fact.

Related art systems are unable to obtain real-time telecommunication cell-specific information during call outages or emergencies. There are no known methods or systems that allow users to obtain up-to-date real-time information associated with a cellular telephone network when needed.

Related art systems are unable to obtain information regarding the deployment of cellular telecommunication sites on a real-time basis. For example, related systems are generally not updated with current information until a deployment project team meets at periodic intervals. In the meantime, deployment project team members are generally unaware of the status of the deployment project until a meeting is held. Accordingly, there is a need for a real-time process that is able to provide deployment project members with real-time up-to-date project information substantially instantaneously once it is entered into the process. Furthermore, there is a need for a process that eliminates the need for maintaining separate databases spread out across various project teams and updating the separate databases.

There are no known related art processes that can provide project teams members with real-time up to date project information once that information is entered into the process. There are no known processes that eliminate the need for maintaining separate databases spread out across various project teams and updating the separate databases. For example the MICROSOFT PROJECT TM process does not provide the type of benefits required for obtaining up to date real-time information associated with the deployment of cellular telecommunication network sites. There are no known related art systems that interact with a user's or project team's electronic mail system to provide real-time information such that when a user executes instructions associated with the process they are made aware of any changes in project status on a real-time basis and they are provided with access to the updated project data on a real-time basis.

In addition, there are no known related art systems or methods that provide auto down streaming, such that if a user changes a project variable such as a date, the process can automatically change downstream dates. Also, there are no known related art systems that provide the user with an electronic mail message if a particular project variable is edited or has been satisfied. There are no known related art systems that allow a user to obtain up to date real-time information associated with the deployment of cellular telecommunication network sites.

SUMMARY

In accordance with the invention the limitations of the related art described above and other limitations that will become apparent upon reading and understanding the present specification are overcome by providing a system, method and apparatus for providing real-time access to a network-organized repository of data and processes, such as software programs, within a distributed data and processes information system.

One aspect of the invention provides a distributed system for providing real-time access to a network-organized repository of data. The system includes a computing system including one or more computers having one or more processors for executing a first set of program instructions and a first memory for storing the first set of program instructions; and a server, in communication with the computing system, the server having one or more processors for executing a second set of program instructions and a second memory for storing the second set of program instructions, the server being configured to support one or more users and to provide shared access to one or more telecommunication computer software programs, the server being coupled to one or more resources for managing, communicating and the storing data and the telecommunication computer software programs; wherein, the resources can be accessed and processed by the one or more telecommunication computer software programs; and wherein a user of the computing system has real-time access to the data and the telecommunication computer software programs and any changes made thereto by one or more other users supported by the server.

Another aspect of the invention provides a method of providing real-time access to a network-organized repository of data. The method includes providing access to one or more telecommunication computer software programs to a computer, the computer having one or more processors for executing instructions associated with the one or more telecommunication computer software programs and a memory for storing the instructions; communicating to a server with the computer, the server having one or more processors for executing instructions associated therewith and a memory for storing the instructions, the server being configured to support one or more users and to provide shared access to the one or more telecommunication computer software programs, the server being coupled to one or more resources for managing, communicating and storing data and the telecommunication computer software programs that can be accessed by the one or more telecommunication computer software programs; and providing a user of the computer with real-time access to the data and the telecommunication computer software programs and any changes made thereto by one or more other users supported by the server.

A further aspect of the invention provides a computer readable medium having a set of telecommunication computer software program instructions encoded thereon. The computer readable medium includes the set of telecommunication computer software program instructions being operative with the computer to: provide access to the one or more telecommunication computer software programs to a computer, the computer having one or more processors that execute instructions associated with the one or more telecommunication computer software programs and a memory for storing the instructions; provide a server, in communication with the computer, the server having one or more processors for executing instructions associated with the server and a memory for storing the instructions, the server being configured to support one or more users and to provide shared access to the one or more telecommunication computer software programs, the server being coupled to one or more resources for the management, communication and the storage of data that is accessed and processed by the one or more computer software programs; and provide the user of the computer has real-time access to the data and any changes made to the data by the other one or more users supported by the server.

Still a further aspect of the invention provides a distributed system for providing real-time access to a network organized repository of data. The system includes a first computing means including one or more means for executing a first set of program instructions and a first means for storing the first set of program instructions; and a second computing means for executing a second set of program instructions and a second means for storing the second set of program instructions, in communication with the first computing means, the second computing means being configured for supporting one or more users and for providing shared access to one or more telecommunication computer software programs, the second computing means being coupled to one or more resources for managing, communicating and the storing data and the computer software programs; wherein, the resources can be accessed and processed by the one or more telecommunication computer software programs; and wherein a user of the first computing system has real-time access to the data and the telecommunication computer software programs and any changes made thereto by one or more other users supported by the second computing means.

Yet another aspect of the invention provides a method of providing real-time access to a network organized repository of data. The method includes the steps of providing access to one or more telecommunication computer software programs to a first computer means for executing a first set of instructions associated with the one or more telecommunication computer software programs and first storing means for storing the first set of instructions; communicating to a second computer means for executing a second set of instructions associated therewith and a second storing means for storing the second set of instructions, the second computer means being configured for supporting one or more users and for providing shared access to the one or more telecommunication computer software programs, the second computer means being coupled to one or more resources for managing, communicating and storing data and the one or more telecommunication computer software programs that can be accessed by the one or more telecommunication computer software programs; and providing a user of the first computer means with real-time access to the data and the telecommunication computer software programs and any changes made thereto by one or more other users supported by the second computer means.

These and various other features of novelty as well as advantages that characterize the invention are pointed out with particularity in the claims annexed hereto and form a part hereof. However, for a better understanding of the various aspects of the invention, reference should be made to the drawings which form a further part hereof, and to accompanying descriptive matter, in which there are illustrated and described specific examples of the system, method and apparatus in accordance with the invention.

BRIEF DESCRIPTION OF THE DRAWINGS

Referring now to the drawings in which like reference numbers represent corresponding parts throughout, where.

DETAILED DESCRIPTION

In the following description of the specific embodiments, reference is made to the accompanying drawings which form a part hereof and which show by way of illustration the specific embodiments in which the invention may be practiced. In the accompanying drawings, like reference numbers represent corresponding parts throughout the several views. It is to be understood that other embodiments may be utilized as structural changes may be made without departing from the scope of the invention.

I. Distributed Information System for Data and Processes

The distributed information system for data and processes in accordance with one embodiment of the invention includes one or more databases and processes, such as computer software programs, that share a common database. In one embodiment, the distributed information system for data and processes can utilize a structured query language (SQL) common database for providing a distributed database management system. For example, a MICROSOFT SQL TM server can be used to provide a common database function whereby a plurality of general-purpose computers in communication with the SQL server can carry out the manipulation of data stored on the SQL server while the SQL server performs other operations associated with the distributed database management system. Those skilled in the art will appreciate that the SQL server can be coupled to or be in communication with one or more storage devices for storing data or computer software programs. In accordance with one embodiment of the invention, any changes that are made to a particular set of data by the one or more computer software programs in one process, or by one or more users, are reflected into and are accessible by other computer software programs within the distributed information system on a real-time basis.

Figure 1:
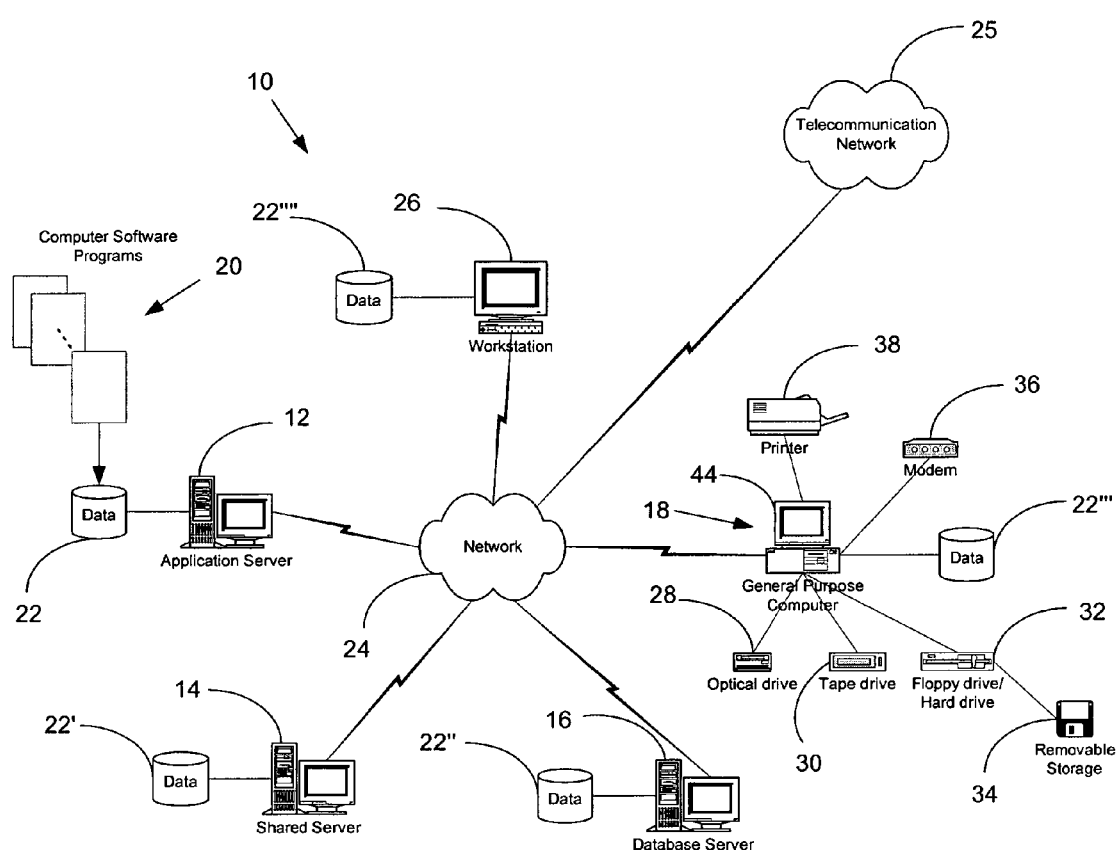
FIG. 1 illustrates one embodiment of a computing system having one or more computers in communication via a network to perform logical operations.

Referring now to FIG. 1, where one embodiment of one set of components that can be used to carry out the system, method and apparatus is illustrated in diagram form. In one embodiment, the system components comprising the distributed information system 10 include an application server 12, a shared server 14, a database server 16, a general-purpose computer 18 and a workstation 26. The application server 12 provides access to one or more computer software programs 20 stored therein or stored in a database 22 in communication with the application server 12. Further in one embodiment, the application server 12 is in communication with one or more other components of the other distributed information system 10, such as the shared server 14, the database server 16, the general-purpose computer 18 and the workstation 26, for example. The one or more system components also can communicate with each other via well-known communications hardware and software. Still further in one embodiment, the one or more system components can be interconnected in a network 24 configuration in accordance with various well-known network topologies. For example, the components of the distributed information system 10 can be interconnected in a bus topology, ring topology, a star topology or combinations thereof. Those skilled in the art will appreciate that any one these network topologies, or combinations thereof, can provide an adequate implementation of the system, method and apparatus.

The general-purpose computer 18, the shared server 14, the database server 16 and the workstation 26 can each execute the computer software programs 20 stored in the application server 12 or programs that are stored in the database 22 depending on the specific implementation. In one embodiment, the general-purpose computer 18 can perform the function of the workstation 26 or other computing systems without departing from the scope of the invention. Those skilled in the art will appreciate that the general-purpose computer 18 can be provided with various peripherals in communication with or coupled thereto. For example, the general-purpose computer 18 can be coupled to an optical disk drive 28 for reading and writing instructions or data to be used by the general-purpose computer 18. Moreover, a tape drive 30 can be coupled to the general-purpose computer 18 for storing data and processes for backup purposes, for example. In addition, a storage device 32, such as a floppy disk drive or hard disk drive can be coupled to the general-purpose computer 18 for storing instructions and data to be used by the general-purpose computer 18. Instructions and/or data can be provided to the general-purpose computer 18 via a removable storage medium 34. A communication device 36 such as a modem can also be provided with the general-purpose computer 18 to serve various communication purposes. Also, an output device 38, such as a printer, or a monitor 44, can be provided in communication with or coupled to the general-purpose computer 18 for providing the user with reports and the like.

In use, a user operating the general-purpose computer 18 sends a request to access the one or more computer software programs 20 from the application server 12. Such computer software programs 20 can then be delivered to the general-purpose computer 18, the shared server 14, the database server 16 or the workstation 26 for execution thereon. Accordingly, any changes that are made by the user operating the general-purpose computers 18 in communication with the network 24 to any of the programs 20 or data residing within the databases 22 distributed throughout the distributed information system 10, will be available and accessible by the other system components and users. Those skilled in the art will appreciate, that if more than one general-purpose computers 18 are interconnected in a network 24, changes to the database 22 made by one user operating one general-purpose computer will be available and accessible to any other user operating any other general-purpose computer 18 in communication with the network 24 on a real-time basis (e.g., substantially instantaneously).

One embodiment of a hardware environment of a general-purpose computer 18, a distributed information system 10, a telecommunication switch and a switch-master, whereby the instructions of computer software program 20 can be executed by, or interact with, are described below. Furthermore, specific embodiments of the computer software programs 20, such as program 20 for receiving and capturing call processing failures and digital cellular switch failures, communicating and managing telecommunication call records, processing court-ordered surveillance requests, obtaining real-time information associated with a network and tracking the deployment of telecommunication network sites on a real-time basis also are described below.

II. General-Purpose Computer

Figure 2:
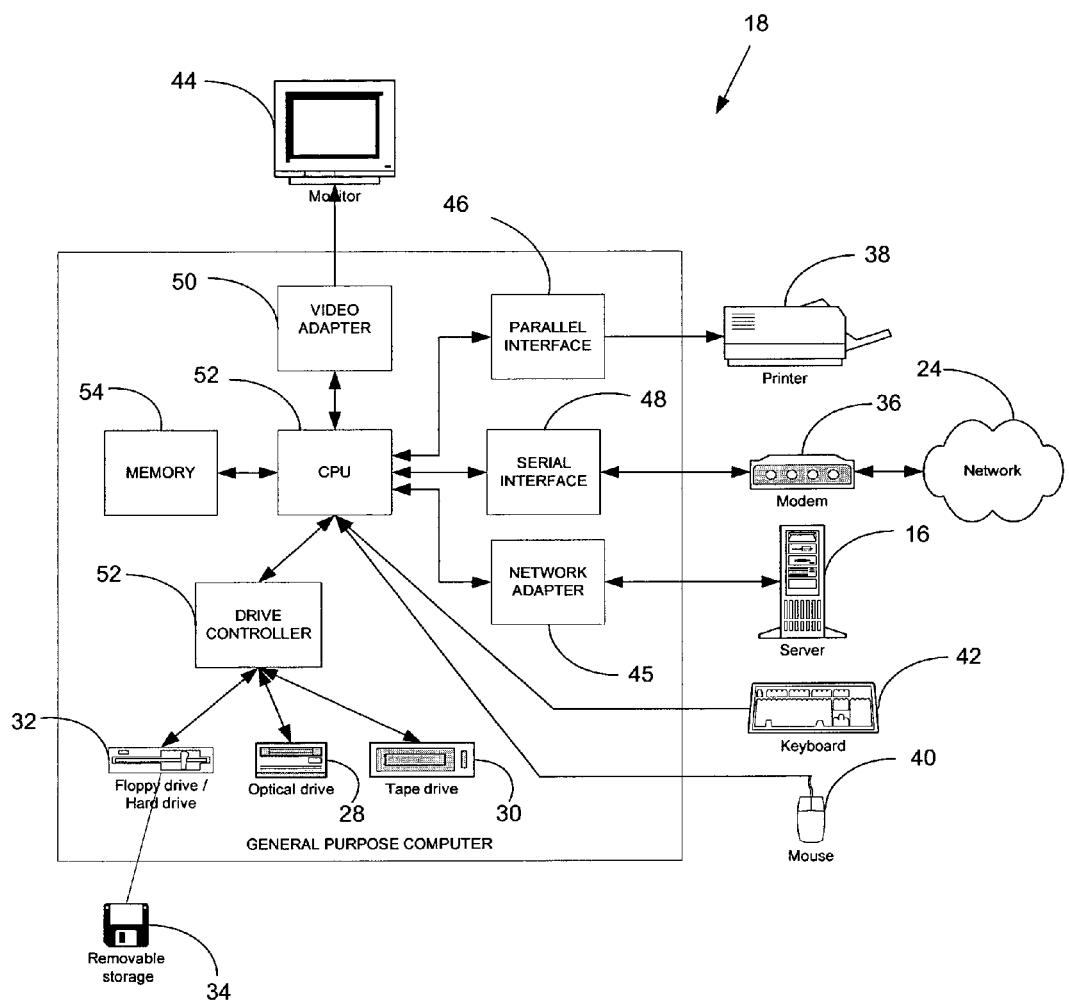
FIG. 2 illustrates one embodiment of a hardware environment of a general-purpose computer to perform the logical operations.

Referring now to FIG. 2, one embodiment of a hardware environment of a general-purpose computer 18 provided for executing one or more computer software program 20 instructions is shown in diagram form. The general-purpose computer 18 can be, for example, an IBM-compatible computer that operates under the control of a number of operating systems. For example, the general-purpose computer 18 may operate under a DOS, OS/2, WINDOWS, WINDOWS NT, UNIX, XENIX, LINUX or PICK operating systems, among others, that are generally well known to those skilled in the art.

In one embodiment, the general-purpose computer 18 can include one or more peripherals that are coupled to or are in communication with the general-purpose computer 18. For example, the general-purpose computer 18 can include several input devices such as a mouse 40 or a keyboard 42. Furthermore, the general-purpose computer 18 can include several output devices such as a monitor 44, a printer 38 or a plotter. In addition, the general-purpose computer 18 can include several communication devices such as, for example, a modem 36.

The general-purpose computer 18 can also be adapted to be coupled to or in communication with one or more other general-purpose computers distributed throughout the distributed information system 10. For example, the one or more general-purpose computers can be interconnected or configured as a network 24. As discussed above, the network topology can be a bus topology, a ring topology, a star topology or combinations thereof without departing from the scope of the invention. Those skilled in the art will appreciate that any one of these network topologies, or combinations thereof, can provide an adequate network implementation for the system, method and apparatus. Still other peripherals may be coupled to the general-purpose computer 18 such as, for example, a storage device 32 such as a hard disk drive or floppy disk drive, an optical disk drive 28, a tape drive 30 and the like. Those skilled in the art will appreciate that the above list of peripherals is not exhaustive and that other peripherals may be utilized in conjunction with the general-purpose computer 18 without departing from the scope of the invention.

The general-purpose computer 18 also can include several other components known generally to those skilled in the art as the motherboard, interfaces, adapters and controllers. For example, a network adapter 45 may be utilized to provide a communication means or to couple the general-purpose computer 18 to one or more other general-purpose computers, one or more workstations, or more mainframe computers or servers distributed throughout the distributed information system 10. Also, a parallel interface 46 may be provided for coupling the general-purpose computer 18 to various printers 38 and plotters. Furthermore, a serial interface 48 may be provided for interfacing a communication device, such as a modem 36 to the general-purpose computer 18. In addition, a video graphics adapter 50 may be utilized to couple the general-purpose computer 18 to the monitor 44. Moreover, a storage device controller 51, e.g., a hard disk drive controller, a floppy disk drive controller or an optical disk drive controller, may be utilized for controlling the hard disk/floppy disk drive 32, the optical disk drive 28, and the like.

The motherboard of the general-purpose computer can include one or more central processing units 52 and one or more memory devices 54 for storing the instructions of software programs to be executed by the central processing unit 52 for carrying out a particular algorithm or function. The one or more central processing units 52 may be custom manufactured for a specific application at hand, or may be selected from a wide variety of processors and controllers that are generally available on the market and well known to those skilled in the art. For example, single chip or multi-chip processors manufactured by the INTEL CORPORATION including the 8051, 80386, 80486, PENTIUM and PENTIUM PRO family of processors can be used. In addition, single chip or multi-chip processors manufactured by the MOTOROLA CORPORATION including the MC68000 and MC68040 can be utilized. Further, various clones of the above listed processors that are readily available on the market can be used. For example, processors manufactured by ADVANCED MICRO DEVICES (AMD), CIRYX, C&T and IBM can be readily adapted and utilized as the central processing unit 52 for the general-purpose computer 18.

The general-purpose computer 18 can also act as a workstation 26 whether it be in a standalone configuration or interconnected in the network 24. In addition, workstations 26 requiring additional performance may utilize reduced instruction set computing (RISC) architecture processors and one or more SPARC central processing units 52 such as those manufactured by SPARC INTERNATIONAL, INC., SUN MICROSYSTEMS, INC., the POWER PC TM by MOTOROLA, the AMD 29000 TM, and the like.

Memory devices 54 such as random access memories (RAM), read only memories (ROM) and erasable programmable read only memories (EPROM) are generally used for storing the instructions of the software programs 20 to be executed by the central processing unit 52 of the general-purpose computer 18 for carrying out specific algorithms or functions. These memory devices 54 are well known to those skilled in the art and are available in a wide range of configurations and from a wide variety of manufacturers. Those skilled in the art will appreciate and recognize that the above recitation of central processing units 52 and memory devices 54 is not exhaustive and that others may be substituted without departing from the scope of the invention.

III. Network Organized Repository of Data

Figure 3:
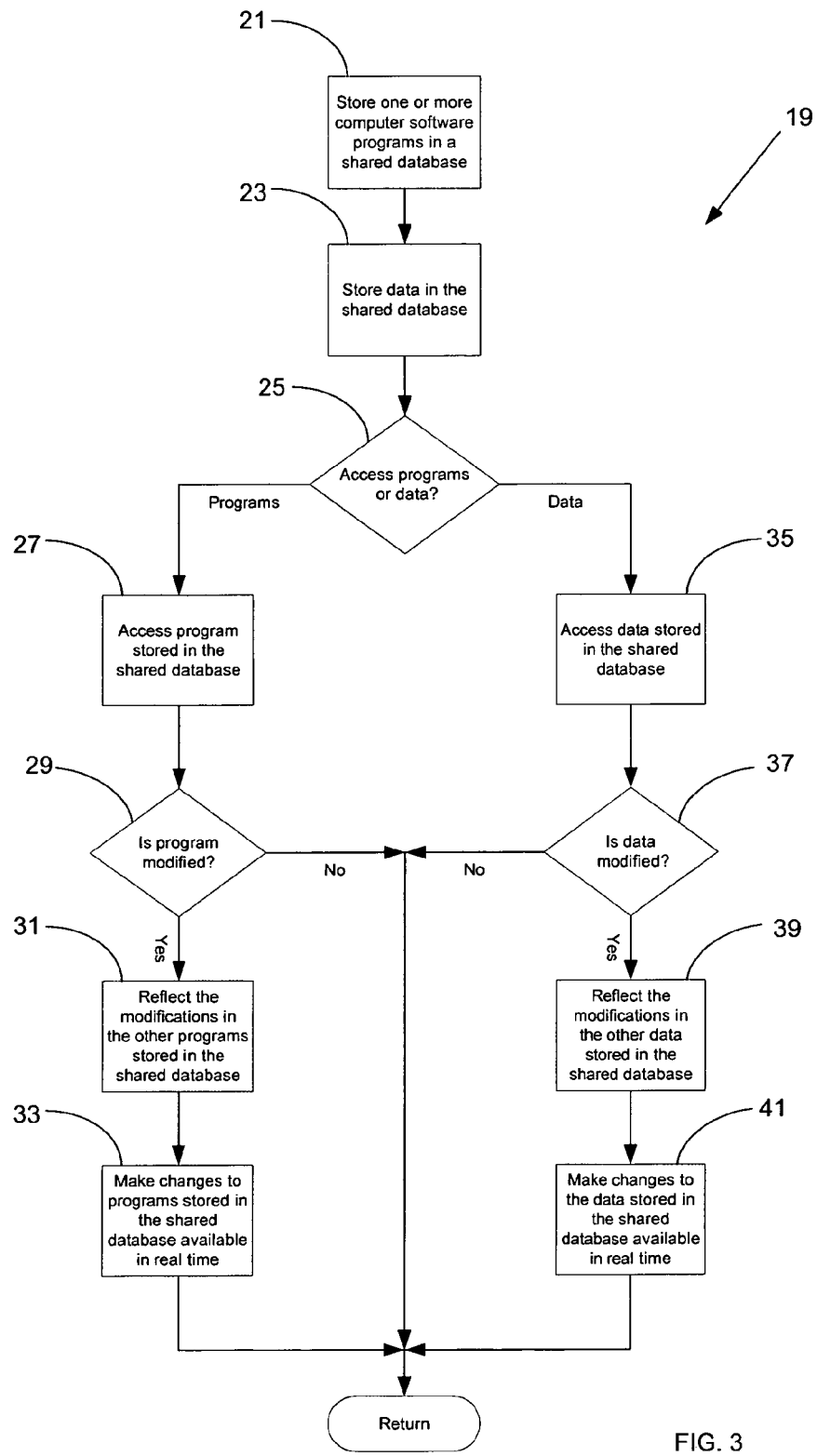
FIG. 3 illustrates one embodiment of a logic flow diagram.

Referring now to FIG. 3, where one embodiment of a logic flow diagram 19 of a network organized repository of data is shown in logic diagram form. At logic block 21, one or more computer software programs 20 are stored in a shared database 22. At logic block 23, data are also stored in the shared database 22. At decision block 25, it is determined whether a user, a process or a computer has requested access to the programs 20 or data that are stored in the shared database 22. If access to the programs 20 is requested, at logic block 27 the user is permitted access to a selected program 20 stored in the shared database 22. At decision block 29, it is determined whether the user has modified the program 20. If the program has not been modified, the logic flow returns to the previous process. However, if the selected program 20 is modified in any way, at logic block 31, any changes or modifications that are made to the program 20 are reflected in the other programs 20 that are stored in the database 22. Furthermore, at logic block 33, the changes made to the programs 20 stored in the database 22 are made available to every other program on the distributed information system 10 on a real-time basis.

If, at logic block 25, access to data is requested, at block 35 the user is provided with access to the data stored in the database 22. If the data are modified, as determined at block 37, at block 39 the modifications made to the requested data are reflected in all other data stored in the database 22. At block 41, the changes made to the data stored in the database are made available on the distributed information system 10 on a real-time basis.

IV. Telecommunication Distributed Database Management System

Figure 4:
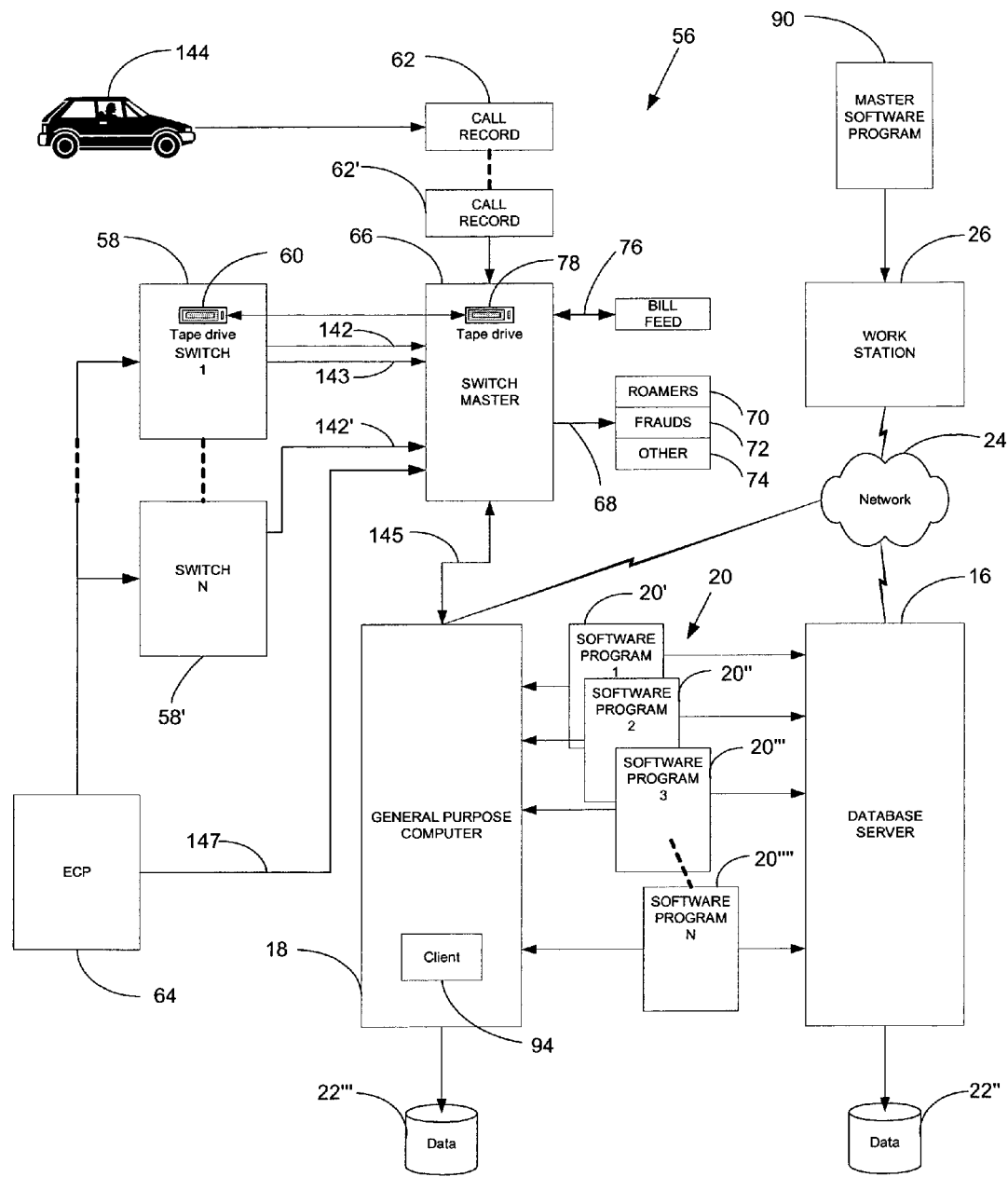
FIG. 4 illustrates one embodiment of a distributed information management system.

Referring now to FIG. 4, where one embodiment of the distributed information system 10 is illustrated which can be utilized as part of a telecommunication distributed database management system 56. In one embodiment, the general-purpose computer 18 can be in communication with one or more other general-purpose computers configured and adapted as the database server 16 component of the telecommunication distributed database management system 56. The database server 16 can be configured as a distributed database management server for creating, maintaining and viewing database data. Those skilled in the art will appreciate that, in addition to the data, the database 22" can also include one or more computer software programs 20 therein.

In one embodiment, the database server 16 of the telecommunication distributed database management system 56 can utilize a structured query language (SQL) database for creating, viewing and maintaining database data. MICROSOFT, ORACLE, GUPTA, INFORMIX, POWERSOFT, ORACLE and SYBASE can all supply SQL databases, for example. Accordingly, the database server 16 can implement an SQL database server such that one or more general-purpose computers 18, workstations 26 or other servers can access and manipulate the data stored in the database 22" that is accessible by the database server 16. In addition, the database server 16 can manage and coordinate the data stored in the database 22 while also performing calculations locally. For example, as discussed above, the database server 16 can be comprised of a general-purpose computer 18 or workstation 26 that includes one or more central processing units 52 for executing instructions according to one or more software programs 20 and a memory 54 for storing such instructions. The database server 16 also can be configured and adapted to perform additional functions and execute additional algorithms in addition to manipulating data within the database 22".

For example, in one embodiment, the database server 16 can execute instructions of a software program 20 for carrying out tasks such as managing the storage and retrieval of database 22" data, generating reports, displaying data, transmitting data to one or more peripheral devices such as printers 38, plotters, facsimiles, modems 36 and other similar devices. In addition, in one embodiment, the database server 16 can execute instructions of one or more software programs 20 for carrying out tasks such as transmitting database data or specific reports to one or more other general-purpose computers 18 or workstations 26 that are in communication therewith.

Further, in one embodiment, the database server 16 can execute instructions of one or more software programs 20 for carrying out tasks such as communicating database 22" data or reports to one or more other computer software programs 20 whose instructions are executed on other general-purpose computers across the telecommunication distributed database management system 56. In addition, the database server 16 can execute instructions of one or more software programs 20 for carrying out tasks such as sending database data or reports to a network address or electronic mail (e-mail) address in response to a query or in response to a predetermined set of conditions. Still further in one embodiment, the database server 16, or for example any one of the one or more general-purpose computers 18 in communication with the network 24, can execute instructions of a software program 20 for carrying out the function of broadcasting a wireless signal to be received by one or more users carrying a wireless device or to be received by other devices having incorporated therein a device in response to a predetermined set of conditions. Those skilled in the art will appreciate that the wireless device can be, for example, a pager receiving a paging signal. Those skilled in the art will recognize that the above-enumerated tasks to be performed by the database server 16 can be performed by other components within the telecommunication distributed database management system 56. Also, such tasks are illustrative in nature are not intended to limit the scope of the invention.

V. Telephone Switch

In one embodiment, as illustrated in FIG. 4, a telecommunication switch 58 provides a communication path or circuit between a transmitting telecommunication device and a receiving telecommunication device, and vice-versa. Those skilled in the art will appreciate that the transmitting and receiving telecommunication devices include telephones (e.g., mobile or cellular) pagers or the like. The communication path or circuit remains in place for the duration of the transaction between the transmitting and receiving devices. The switch 58 can process various signal types. For example, the switch can process voice (e.g., digital and analog voice), data, text, images and the like. As described herein, the telecommunication switch 58 can be associated with both wireless and wireline telecommunication devices. Furthermore, in one embodiment of, the telecommunication switch 58 can refer to an electronic switching office that switches calls from a cellular telephone to a wireline telephone or a digital cellular switch. The telecommunication switch 58 also can perform such tasks as controlling the handoff of transactions between cells in a cellular network and monitoring various transaction parameters. For example, the telecommunication switch 58 can provide telephone usage, cell monitoring data or transactional data, hereinafter referred to as call records 62, to various components of the telecommunication distributed database management system 56. The call records 62 are generated by telecommunication devices, for example from cellular telephones owned by subscribers 144. One embodiment of the telecommunication switch 58 also can include a storage device 60, for example it can include a tape drive, a hard drive, a disk drive or optical drive for the local storage of various call records 62.

An electronic control processor 64 (ECP) can be provided within the system for controlling the telecommunication switch 58. The ECP 64 can control the operation of one or more telecommunication switches 58 servicing a particular geographic region. For example, each geographic region near a major metropolitan area will generally have one or more ECP's 64 for controlling the operation of one or more telecommunication switches 58. In one embodiment, the data emerging from the ECP 62 include AMA records. AMA records are automatic message accounting records, which is another name for call records.

Furthermore, the ECP 64 can be configured to send a feed out to a switch-master 66 for clone detector fraud and at the same time, the ECP 64 can send a feed out to the home office. In other words, the ECP 64 can act as a gateway for directing where some of the call records 62, such as cell records, should go. Those skilled in the art will appreciate that the call records 62 can be exported into one of the programs 20 within the system 56, such as a spreadsheet, for additional analysis. Several different feeds also can be provided from the switch 58 to the switch-master 66. For example, a billing feed 142 and a data feed 143 can both be provided from the switch 58 to the switch-master 66. Alternatively, the data feed 143 can provide information associated with telecommunication failure data to the central office without the billing information. Feed data can be analyzed in various ways. For example, an analysis can be conducted with respect to how the ECP 64 viewed a particular telecommunication failure and how the switch 58 viewed the telecommunication failure, for example.

In a market using exclusively ERICSSON wireless technology and ERICSSON telecommunication switches 58, for example, the data feed 143 can be handled differently. The ERICSSON implementation is generally provided with a separate processor and a user back at the central office receives very little information. The majority of analysis will be performed based on the billing records. As discussed above, one embodiment of a telecommunication switch 58 can be a digital cellular switch. In one embodiment, the ECP 64 also can be coupled to the switch-master 66, which is discussed below.

VI. Switch-Master

In one embodiment, as illustrated in FIG. 4, the ECP 64 and/or the switch 58 interfaces with the switch-master 66. The switch-master 66 is an electronic device that operates under the control of a UNIX operating system, for example. Its function is to take a feed 147 coming from the ECP 64 that the AMA is teleprocessing. In addition, the telecommunication company's billing department uses the switch-master 66 for collecting call records 62. Moreover, the switch-master 66 can provide feeds 68 for detecting roamers 70, frauds 72 and other functions 74. The switch-master 66 is generally contained within a building at a particular telecommunication cell site. It is not part of the manufacturer's equipment, such as LUCENT, ERICSSON, nor is it part of the switch 58. The switch-master 66 is a self-contained electronic device that performs its own set of functions.

As discussed above, the switch-master 66 generally operates under the control of the UNIX operating system and, generally, there is a switch-master 66 for every switch 58 throughout a given telecommunication system. The switch-master 66 is maintained by a special group and is generally used for billing purposes. For example, the switch-master 66 can be provided with a billing feed 76 used for sending billing information to the billing system of the telecommunication system.

One embodiment of the switch-master 66 includes a storage device 78. For example, the switch-master can include a tape drive, a hard drive, a disk drive or an optical drive for local data storage. The switch 58 corresponding to a specific switch-master 66 stores all of the switch's 58 call records 62 on the switch-master's 66 own storage device 78. Periodically, every morning for example, the call records 62 stored in the switch's 58 storage device 60 are transferred and stored into the switch-master's 66 storage device 78. Accordingly, the entire billing contained in the switch 58 is sent to the storage device 78 within the switch-master 66 to be stored therein. One embodiment of the storage device 60 can be provided within the switch 58 itself, and accordingly, information stored in the storage device 60 can be provided to the switch-master 66. Memory can also be provided within the switch 58 or the switch-master 66 for temporarily storing the information prior to transferring it to a storage device (e.g., within the switch 58 or within the switch-master 66, depending on the direction in which the information is being transferred).

Figure 5:
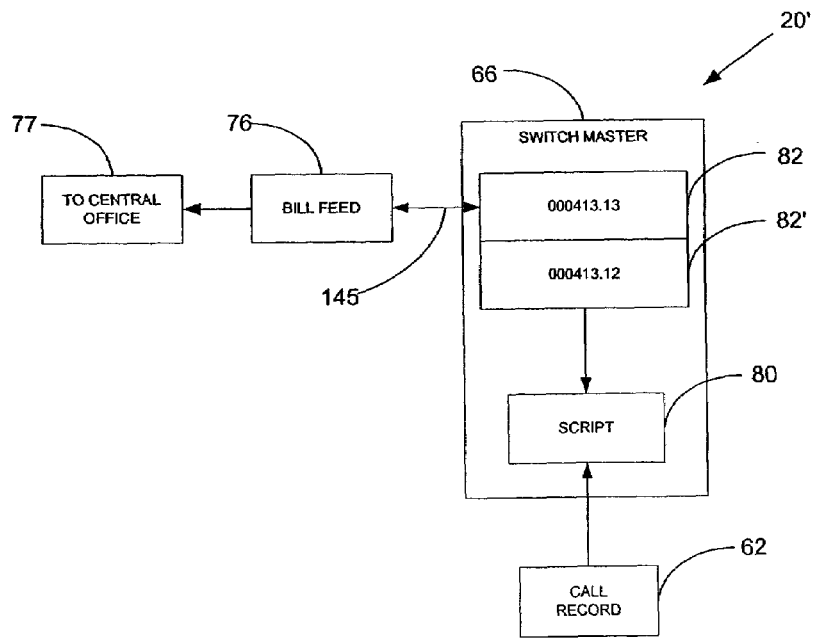
FIG. 5 illustrates one embodiment of a diagram of a telecommunication switch.

Turning now to FIG. 5, where one embodiment of a computer software program 20' is illustrated which interacts with the switch-master 66 as follows. The computer software program 20' allows a user logged into the general-purpose computer 18 to log into the switch-master 66 and execute a script 80. The script 80, in turn, allows the user to access a file 82 containing the call records 62 stored within the switch-master 66. When the switch-master 66 receives a billing feed 76, for example a serial feed, it dumps the call records 62 to the file 82. Generally, that file 82 is given a name, such as "000413.13," which represents the year, hour and day that the file 82 was created. Once these files 82 are generated, they can be compressed and the name of the file can subsequently be changed. Once the information is written to the file 82, the script 80 takes out the feed 76 and the file 82 is sent to the central office 77. In case there is a network failure, for example, a transmission control protocol/internet protocol (TCP/IP) connection failure, during the transfer, a pointer is stored within the switch-master 66 indicating the last record that was sent.

One embodiment of a computer software program (e.g., DD_RUN, to be discussed in more detail below) constantly looks for such system failures. Accordingly, if a failure occurs, the software program 20 provides instructions to the general-purpose computer 18 to shut down all processes and then restore them. Therefore, when the user logs in and executes the script 80, the script 80 is able to determine the last call record 62 that was sent prior to the interruption in the communication channel and will send the next call record 62 on the list.

In the event of a shutdown or loss in communication, there is always the possibility of actually losing some call records 62. If such a failure occurs, several call records 62, up to 200 for example, may actually be lost. Although the likelihood of losing a large number of call records 62 is remote, the system 56 provides the ability for determining who the calling party was and to see how they were being billed and resolve the situation. The system 56 can recreate more than 99% of the call records 62 and the billing records in case of a loss in communication during transmission.

VII. Computer Software Programs

Figure 6:
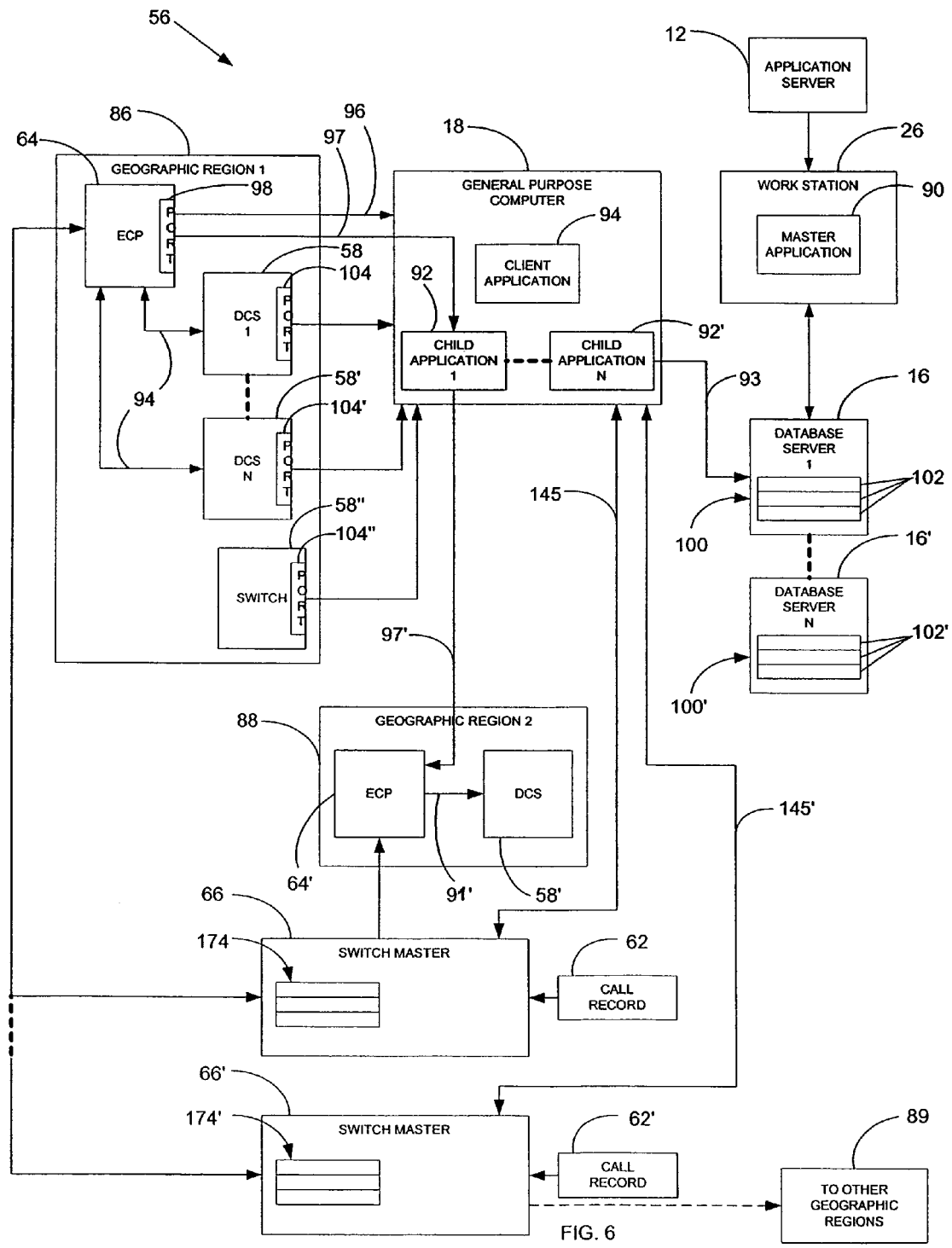
FIG. 6 illustrates one embodiment of a distributed information management system.

A. Capturing and Processing Call Processing Failures Occurring at a Telephone Switch Control Processor and Call Processing Failures Occurring at a Digital Cellular Switch Referring now to FIG. 6, where one embodiment of a system 56 for capturing and processing call processing failures occurring at a telephone switch control processor 64 and at a digital cellular switch 58 is shown in diagram form. The instructions of one or more computer software programs 20 (e.g., child applications 92) are executed on a general-purpose computer 18 for carrying out the function of capturing and processing the telephone call processing failure data collected at the switch 58 on a real-time basis (e.g., substantially instantaneously as the failures occur). In one embodiment, the instructions of the one or more software programs 20 can be executed on a general-purpose computer 18 for carrying out the function of analyzing the captured data and presenting the data to one more users that are logged into the network 24. In addition, the data can be presented in various user definable ways.

In one embodiment, the electronic control processor 64 (ECP) is in communication with or coupled through a connection 91 to one or more digital cellular switches 58 (DCS). The ECP 64 and the DCSs 58 are located at a cell site 86 located in a given geographic region. For example, in the state of Florida there may be a cell site 88 located in West Palm Beach, a cell site 88 in Ft. Lauderdale, and so on. The ECP 64 is in communication with the switch-master 66. Physically, the switch-master 66 may be located remotely from the site 86 or may be contained in proximity of the ECP 64, within the same building for example. The ECP 64 is also in communication with the general-purpose computer 18 executing the instructions of one or more computer software programs 20 therein. For example, the instructions of a client computer software program 94 may be executing in the general-purpose computer 18 in conjunction with the instructions of a master computer software program 90 on the workstation 26. In addition, the instructions of one or more child computer software programs 92 may also be executing in the general-purpose computer 18 in order to continually capture and process call processing failure data occurring either at the ECP 64 or at the DCS 58 of a given cell site 86, 88 within a telecommunication system.

In one embodiment, the general-purpose computer 18 is in communication with one or more SQL servers 16 of the type described above. The one or more SQL servers 16 also can be in communication with the general-purpose computer 18 configured and adapted to act as the workstation 26. Accordingly, the workstation 26 also can be in communication with the application server 12. Those skilled in the art will appreciate that the one or more SQL servers 16, the general-purpose computer 18 and the application server 12 can be interconnected in the network 24.

In one embodiment, instructions of the client software program 94 can be executed in conjunction with several prerequisites in order to perform a given function. For example, the general-purpose computer 18 can execute the instructions of three distinct software programs simultaneously: a master software program 90 (hereinafter m_cpfail), the master's child software programs 92 (hereinafter s_cpfail) and the client software program 94 (hereinafter c_cpfail).

One embodiment of the instructions of the master software program 90 can be executed to perform the function of monitoring the execution of the instructions of the child software programs 92, assuring that failure data is continually received from the operations and maintenance platform (OMP processor), performing paging functions and maintaining data and logging administrating functions. The instructions of the child software programs 92 can be executed to carry out the function of establishing communication links to each OMP location, (e.g., by way of TCP/IP), filtering the received data and providing any predetermined fields to the SQL server 16, for later processing.

One embodiment of the instructions of one child software program 92 can be executed to collect failure data from each OMP location. The instructions of the client software program 94 can then be executed to carry out the function of displaying the data that were collected in various formats as predefined by the one or more users logged into the network 24. For example, the display format can include a graphical output format. Of the three software programs 90, 92, 94 whose instructions are executing, the client software program 94 is accessible to the one or more users. The instructions of the software programs 90, 92, however, are executed on a stand-alone basis and are generally not accessible to the users. For example, in one embodiment, the instructions associated with software programs 90, 92 can be executed on a stand-alone WINDOWS NT workstation 26 having administration privileges configured not intended for general use.

One embodiment of the ECP 64 that controls multiple switches 58 can be adapted to receive information from the switch-master 66. Further in one embodiment, the ECP 64 also can monitor any call processing failure records. Accordingly, a telecommunication system performance management team member, or system user at the central office, is able to view the failure data messages occurring at the ECP 64 on a real-time basis. For example, in implementations using a switch 58 manufactured by the LUCENT COMPANY, a feed 96 can be established between the ECP 64 and the general-purpose computer 18. The call processing failure records, and various other types of messages depending on the configuration of the ECP 64, are then sent to a specific port 98. The port 98 can be adapted in order to capture and receive the call processing failure records and then transmit the failure data messages to the general-purpose computer 18 that the user is logged into. Certain portions of the failure data messages and other information can then be stored into specific tables 100 having fields 102 in the SQL database server 16, for example.

In operation, the user operating the general-purpose computer 18 at the central office points to and clicks on an icon on the display device 44 representative of the application server 12 and thereby executes the instructions of a software program 20 for carrying out the function of establishing a communication connection 93 between the general-purpose computer 18 and the SQL database server 16, and retrieving specific information requested by the user on a real-time basis. The user then establishes a communication connection 97 between the general-purpose computer 18 and the ECP 64. Once the communication connection has been established with the ECP 64, the user can retrieve the call processing failure messages from either the ECP 64 or the DCS 58.

The physical location of the ECP 64 may vary without departing from the scope of the invention. In general, the ECP 64 can reside within the same building in which the cellular switch 58 resides. The total number of cellular switches 58 that are located at a particular location 86, 88, 89 will vary depending upon the telephone call traffic for the particular geographic region 86, 88, 89 in which the switches 58 are located. For example, some regions may have three or more switches 58 within the same building or the switches 58 may be spread out in separate buildings throughout the geographic region 86, 88, 89. For each switch 58 there can be provided separate output ports 104. For example, instructions of the child software program 92 can be executed for carrying out the function of receiving and capturing information from each separate switch port 104. Accordingly, there can be provided separate output ports 104 for each individual switch 58 handling a particular geographic region 86, 88, 89.

In one embodiment, the operation of the cell site can be made to be automatic. For example, instructions of a computer software program 20 can be executed for carrying out the function of collecting the data portion of the cell while the instructions of the child software program 92 can be executed to provide that child 92 with enough intelligence to monitor its execution and to ensure that it continues collecting failure data messages from the ECP 64 or the DCS 58, depending on the specific implementation used.

Those skilled in the art will appreciate that more than one database server 16 can be utilized without departing from the scope of the invention. For example, two or more separate database servers 16 can be deployed, one serving a first set of computer software programs, the second serving another set of computer software programs, and so on. Having a multi-database server configuration is advantageous in case the operation of the first database server 16 fails. In the event of such failure, the second (or nth) database server 16' can be utilized to perform data collection until the operation of the first database server 16 is restored. In other words, the second database server 16' can act as a back up to the first data base server 16. It will be apparent to those skilled in the art that this concept can be extended to include a plurality of database servers working in conjunction and acting as backups for each other. The act of switching the operation between one database server and another can be performed either manually or automatically.

Figure 8:
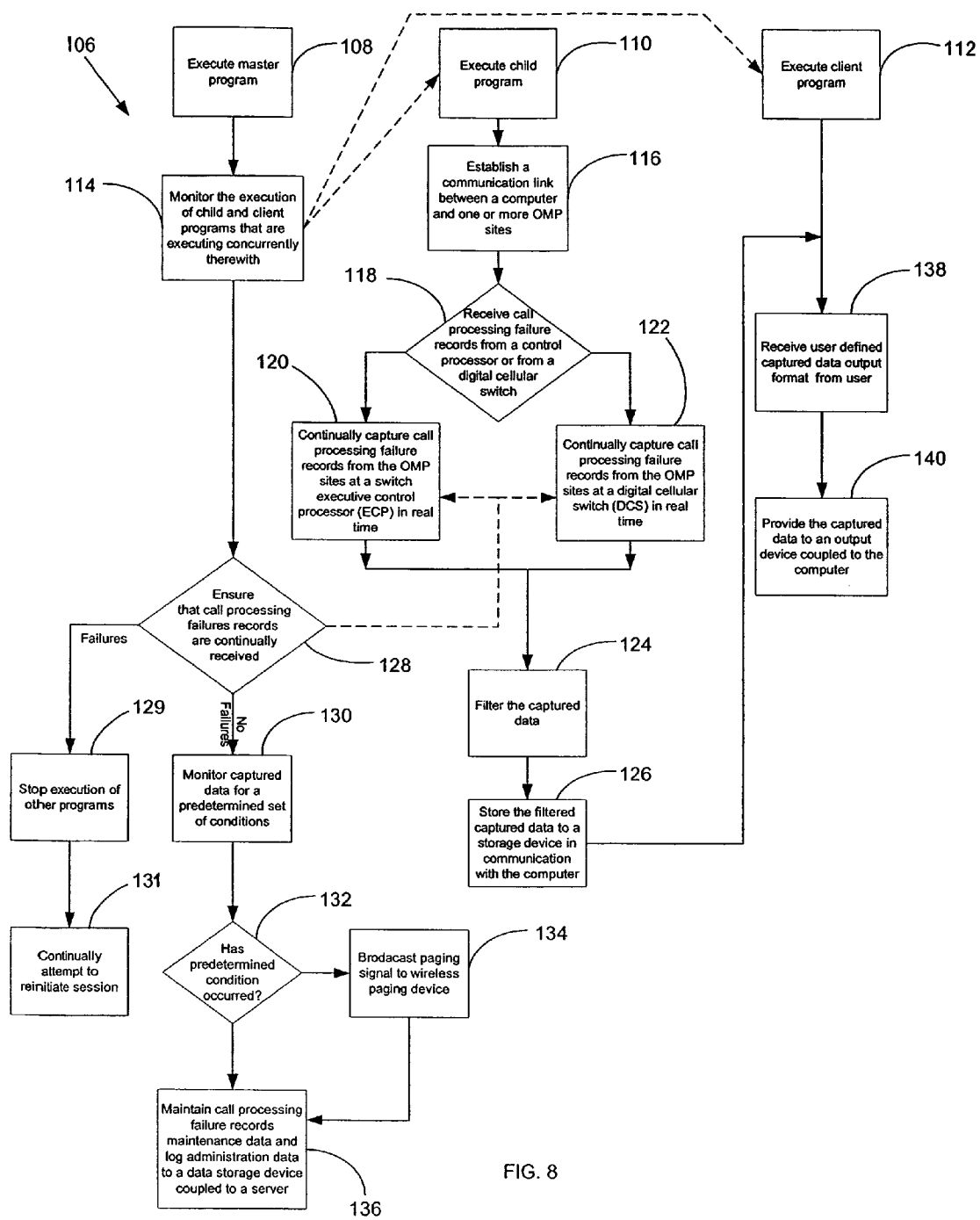
FIG. 8 illustrates one embodiment of a logic flow diagram for monitoring and capturing telecommunication system data.

Turning now to FIG. 8, where one embodiment of a logic flow diagram 106 for capturing and processing call processing failure data messages occurring at a telephone switch control processor 64 and occurring at a digital cellular switch 58 is shown in diagram form. At block 108 instructions associated with the master software program 90 are executed. At block 110 instructions associated with the child program 92 are executed. At block 112, instructions associated the client program 94 are executed. Once the instructions for the master program 90, the child program 92 and the client program 94 are executed, at block 114, the master program 90 begins monitoring the execution of the child software program 92 and the client software program 94. These instructions execute concurrently.

Once the instructions associated with the child program 92 begin executing at block 110, the child software program 92 establishes communication links between the general-purpose computer 18 and one or more OMP sites at block 116. At decision block 118, it is determined whether the child software program 92 is to receive call processing failures from the ECP 64 or from the DCS 58. If the call processing failure records are to be received from the ECP 64, at block 120, the child software program 92 executes instructions for continually capturing call processing failure records from the OMP site at the telecommunication switch control processor ECP 64 on a real-time basis. If it is determined that the call processing failure records are to be received from the DCS 58 side, the child software program 92 executes instructions for continually capturing call processing failure records from the OMP sites at a digital cellular switch DCS 58 on a real-time basis at block 122.

While the child software program 92 continually captures call processing failure records at blocks 120, 122, the master software program 90, at block 128, ensures that the call processing failure records are continually received. If the master software program 90 detects that, for some reason, any one of the currently executing instances has a problem, or if it detects that the LAN connection 145 is down, the master software program 90, at block 129, will stop the execution (e.g., close) of every instance of the software programs currently executing, and, the master software program 90, at block 131, will then continually try to reinitiate the session. Meanwhile, the child software program 92, upon continually capturing the call processing failure records, filters the captured data at block 124 and at block 126 stores the filtered captured data to a storage device 22 that is in communication with the general-purpose computer 18.

Meanwhile, the master software program 90, at block 130, monitors the captured data and looks for a predetermined set of conditions within the failure data messages. At decision block 132, the master software program 90 continuously checks if the predetermined condition has occurred. If the predetermined condition has occurred, at block 134, the master program 90 executes instructions that ultimately result in broadcasting a signal to a wireless telecommunication device. At block 136, the master program continuously maintains call processing failure records and also logs any administration data to the data storage device 22" coupled to the data base server 16.

The client computer software program 94, which is the only computer software program available to a user, can receive user-defined instructions for how to format the captured data at block 138. Once the user has determined the particular format for outputting the failure data messages, at block 140, the client program 94 provides the captured data messages to an output device coupled to the general-purpose computer 18 in accordance with the user's formatting instructions.

In one embodiment, the computer software program 20 provides several options and features. As described above, at block 134 of logic flow diagram 106, the software program has the ability to alert users of the occurrence of certain events based on various predetermined thresholds by automatically executing instructions for broadcasting, for example, a paging signal to one or more wireless paging devices. Thresholds can be set up to be dependent on time of day, call volume, the number of call failure data messages captured and the like. In a further example, one or more users may want to receive a paging signals in the event a particular cell site reaches a predetermined number of failure data messages of a particular type. In one embodiment, the users are permitted to specify the various threshold levels to be monitored. For example, one user may want to be paged if 50 failures occurred at 2:00 am. Another user may not want to be paged if less than 50 failures occur at 12:00 noon. Still another user may program the system to receive a page if 5,000 failures occur at 12:00 noon and if 50 failures occur at 12:00 midnight. Accordingly, the system provides means for allowing the one or more users to customize the individual threshold settings to satisfy their individual needs.

In one embodiment, the failure data message analysis is performed on a real-time basis. For example, the information received and captured at the ECP 64 or DCS 58 side of the telecommunication system is updated and displayed on a continuous basis by the general-purpose computer 18 operating in conjunction with the other network 24 components such as the database server 16, and the like. There exist a variety of methods that can be employed for analyzing the call failure data messages. For example, in one embodiment, the analysis can be performed on the basis of the specific hour, cell site, phase or radio (cellular telephone). In one embodiment, when the user first executes the software program the user is initially provided with data on an hourly basis and the user can then change these settings to ones that better suit.

Furthermore, the one or more users can be equipped with two or more general-purpose computers 18 at the central office that are in communication with the network 24. For example, a number of users can have two or more general-purpose computers 18 at their desk whereby one of the computers can be configured to have a specific screen open at all times, while the other computer can be configured to have a different screen open at all times. For example, one screen may be displayed such that the user can see, in real-time, how many call failures have occurred throughout the telecommunication system. These failure types can be displayed at the top of the screen. The user can then click on the heading in order to see what those failure types actually are. The lost calls, which are calls that were actually lost, are then displayed at the bottom of the screen.

To obtain additional information with regards to the call failures, the user can type, for example, "raw" in the command line and the software program will display all of the actual call failures. Furthermore, the user can sort the call failures based on various fields. For example, the user can sort the call failures based on directory number. The user can look at the output block to see if there exist any patterns and determine whether they are associated with a particular number. If a pattern emerges the user will see something stand out right away. The user also can sort the cell failure types by cellular telephone number. For example, if one particular cellular telephone number has a problem, the user will have the ability to view the raw record of the call failures associated with that particular cellular telephone number on a real-time basis.

The call processing failure records can be broken down even further. For example, the call processing failure records can be broken down according to every single failure that occurs. Furthermore, the call processing failure records can be broken down into current (Amperage), for analog telephones, or time division multiple access (TDMA), for the digital telephones. The call processing failure records also can be broken down and viewed on an hourly basis or they can be broken down and viewed on the basis of the specific cell. For example, if a particular cell has had either a lot of traffic or has a large number of failures associated therewith, for example 976 failures recorded in one day, the user more than likely will go in to view the raw data in order to determine the cause of the failure at that cell or try and determine whether a failure pattern exists for that cell. If the processing failure records are broken down and analyzed in terms of cellular telephone numbers, the user is then able to determine the worse cellular telephone in the entire telecommunication system.

Some processing failure records exhibit failure patterns that are easier to spot than others. For example, if there are problems with the telephone, an entire page may be filled with the same telephone number and that pattern will stand out and be readily apparent to the user. Upon detecting a certain failure pattern, the user will generally attempt to contact that particular subscriber 144 and work out the problem. Other failures, for example, could be caused by the telephone itself or the telephone may actually be turned off. Sometimes, the subscriber 144 may be in the middle of a telephone call, and for various reasons, the telephone will be powered off or the battery will go dead in the middle of the call. These are seen by the system 56 as failures merely because the call was terminated, however, the subscriber 144 generally knows when these situations arise and the issues can be readily worked out.

One embodiment of the software program 20 can be configured such that it reports the worst failure that occurs in the telecommunication system and the type of failure that occurred in the system when the software program is first invoked by the user. As illustrated at block 138 of logic flow diagram 106, the user has the ability to filter the output based on any single failure type. In addition to viewing the data, the user can also print the data.

In one embodiment, the user can invoke a software program 20 and execute instructions associated therewith for querying the database 22. For example, the user can query the database 22 based on a specific failure type or run a query based on a specific directory number. In accordance with the specific query, the system responds by showing the user the number of telephone call failures. For example, the output can illustrate that a particular telephone number queried had multiple failures, e.g., 128 before midnight. Accordingly, the user can readily deduce that something has gone wrong with that particular cellular telephone. In another example, the database can be queried based on the type of cellular telephone and call failures can be retrieved and displayed accordingly. Furthermore, the user can query the database 22 based on a variety of other failures, for example, hand-off failures between cell sites. As discussed above, the user has the option of viewing the failure reports in a number of canned report formats, which are provided by the system 56.

In one embodiment, the user has the option of executing instructions for running a "glare." Glare means that there are two identical telecommunication devices trying to be used at the same time. This is generally an indication that something has gone wrong. The user has the option of executing instructions for running a glare in accordance with trunk group, serial number or numbered history. The user also can output a report based on the cell number. For example, a cell report for cell number 8 will provide the user with every failure that occurred within cell number 8. The reports can be outputted to the display and can include the directory number, when it failed, what the failure was, the serial number, the cell and DCS, station class mark, what type of a call it was, trunk group member number, which cellular telephone it was on, whether it was answered, whether there are any call backs and so on.

Furthermore, the user can output a report based on a directory number and retrieve records as far as, for example, 90 days in the past. Those skilled in the art will appreciate that the number of days can be preset based on the available memory on the server 16 or in the database 22, and should not be considered as limiting the scope of the invention. The user also can use the backlog from a directory number. For example, if a subscriber 144 called the central office because of a problem they were experiencing on their line, the user will proceed to query the database 22 and make a determination as to whether there had been any failures on that particular line on that day.

Generally, users have three tools that they rely on for troubleshooting, namely, the graphical output, the investigation screen and the paging signal broadcast output. Thus, the user has the capability of graphing the call processing failure records and generating an output in the form of a graph. Furthermore, the investigation screen provides the user with the capability of setting up various thresholds and thereby broadcasting a paging signal to a remote wireless paging device based on a predetermined, user selectable condition. Such paging broadcasts are tracked by the system 56 and an investigation number is tagged to the broadcast. Accordingly, the person or wireless telecommunication device that was signaled can call back into the central office, specify the investigation number and the user will be able to show them all of the failures that are associated with that specific investigation number. Those skilled in the art will appreciate that any identifiers such as an investigation number, a cell name and the like may be tagged to the paging signal broadcast for reference purposes.

There are other screens that can be viewed by the user on the output device. For example, the user can view a threshold screen where the thresholds can be viewed and specified. Such thresholds can be weighed based on the title and date, and other thresholds can be based on the various failures that can occur. The user also can apply system averages that can be tracked. Accordingly, if the user knows that, on average, there are 400 lost calls in the middle of the day and 300 at eleven o'clock, for example, the user can enter these values in the threshold screen and automatically have the system 56 generate what the threshold level should be. The system 56 also provides a paging screen that allows the user to specify who the individuals to be paged are, what their numbers are, and the like. In addition, the system 56 can be provided with functionality that allows the user to broadcast a paging signal to a digital pager. Moreover, the broadcast signal can page an Internet Protocol Suite (IPS) pager where the user can send an electronic mail (e-mail) address and perform additional paging functions. The messages are then stored on the SQL server 16 after being parsed.

B. Communicating and Managing Telephone Call Records

Figure 9:
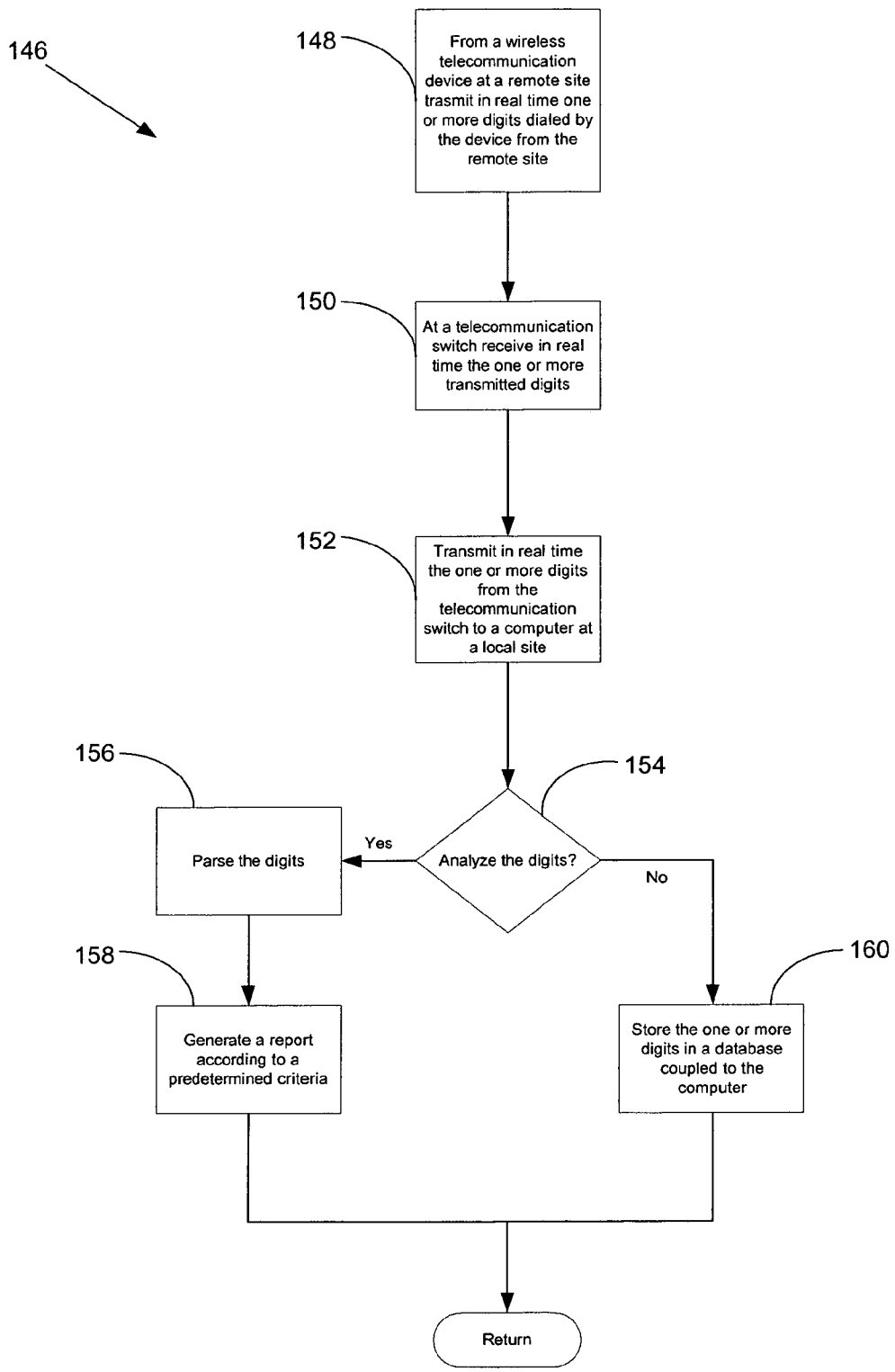
FIG. 9 illustrates one embodiment of a logic flow diagram for communicating and managing telecommunication system data.

Referring now to FIG. 9, where one embodiment of a logic flow diagram 146 is illustrated in diagram form. The logic flow diagram 146 includes a series of steps representing instructions to be executed by a general-purpose computer 18. Beginning at block 148, from a telecommunication device such as a wireless telephone located at a remote site, one or more digits dialed by the telecommunication device that are associated with a call record 62 are transmitted from the remote site on a real-time basis. At block 150, a telecommunication switch 58 receives the one or more transmitted dial digits in real-time. At block 152, the transmitted one or more dial digits received by the switch 58 are transmitted to the general-purpose computer 18 located at a local site in real-time.

Upon receiving the one or more dial digits, the general-purpose computer 18 determines whether to analyze the dial digits in accordance with the user's instructions at block 154. If the general-purpose computer 18 has been programmed to analyze the dial digits, at block 156, the telephone dial digits are parsed and at block 158 a report is generated in accordance with a predetermined criteria as programmed by the user. If a determination is made at block 154 not to analyze the dial digits at that time, the one or more dial digits, at block 160, are stored in the database 22 coupled to the general-purpose computer 18.

Referring back to FIG. 4, where one embodiment of a system 56 for communicating and managing telephone call records is illustrated in block diagram form. In one embodiment, the general-purpose computer 18, for the purpose of communicating and managing telephone call records 62, executes instructions of one or more computer software programs 20. The telephone call records 62 can be the actual telephone billing records. In one embodiment, the one or more computer software programs 20 allow the user to query the call records 62 stored in the database 22 based on several variables such as the telecommunication device number (e.g., cellular), any particular digits that were dialed by the telecommunication device or the serial number of the telecommunication device.

The switch-master 66 is in communication with the switch 58 by way of a billing feed communication link 142. In one embodiment, the billing feed communication link 142 can be a landline or can be a wireline connection. The switch-master 66 also is in communication with a first general-purpose computer 18. One embodiment of the switch-master 66 and the general-purpose computer 18 can be arranged in a network 24, such as a local area network (LAN) configuration. The general-purpose computer 18 also is in communication with the database server 16, such as a computer having an SQL server, which in turn is in communication with a second general-purpose computer adapted and configured as a workstation 26.

The first general-purpose computer 18 is configured to execute instructions of one or more computer software programs 20. For example, the general-purpose computer 18 can execute instructions according to a first software program ("NTSTART" hereinafter) for carrying out the function of resetting various memory or storage tables 100 available on the network 24 to a known state. The NTSTART software program then initiates the execution of instructions according to a second software program ("DD_RUN" hereinafter) for carrying out the function of checking the status of any child software program 92 and for looping through various hosts. In addition the DD_RUN software program can check the sanity of the overall system 56 and on a real-time basis the status of the system 56 based on the switch 58 type. For example, if the switch 58 is a LUCENT switch, DD_RUN checks the system 56 status approximately every 15 minutes. If the switch 58 is an ERICSSON switch, DD_RUN checks the system 56 status approximately every 60 minutes. In addition, the DD_RUN software program initiates the execution of instructions according to two more other software programs ("DD_ALL" and "DD_ALLE" hereinafter).

The general-purpose computer 18 also executes instructions according to another software program ("DD_MON" hereinafter) for carrying out the function of providing real-time summaries, including the real-time summary of the last call record 62 or the last activity performed on the system 58, the number of records and the number of records inserted in the database 22 per second or per hour. Further, the general-purpose computer 18 executes another set of instructions according to a software program ("DD_QRY" hereinafter) for carrying out the function of providing a user interface and a subscriber's 144 telecommunication device number, telecommunication device serial number and the number of digits dialed by the telecommunication device ("dialed digits" hereinafter). The DD_QRY software program also provides various reports and has the capability of exporting data to other computer software programs executing on the system 56.

As discussed above, other instructions that are executed by the general-purpose computer 18 include DD_ALL and DD_ALLE, which are used to establish a communication session between a network 24 component and a telecommunication system component. For example, these instructions, when executed, can establish a TCP/IP communication session between the general-purpose computer 18 and the switch 58. Further, these instructions also can parse the call records 62 and provide the call records 62 to the database server 16.

Further, one or more computer software programs 20 can be provided for carrying out the function of communicating and managing telecommunication call records 62 from the subscriber 144 on a real-time basis. By real-time, it is meant that the user at the central office can access the telecommunication call records 62 from the subscriber 144 as soon as, or substantially instantaneously after, the subscriber 144 hangs up or terminates the telecommunication transaction with the switch 58. For example, generally within 10–15 seconds from when the subscriber 144 hangs up, the call records 62 become available for the user to review. Moreover, computer software programs 20 can be provided for carrying out the function of maintaining the telephone call records 62 in the database 22 over an extended period. For example, more than 400,000,000 telephone call records 62, representing about 10 weeks worth of telephone call records 62, can be stored by the system 56 in the database 22.

Those skilled in the art will appreciate that the user, or users, of the system 56 and computer software programs 20 include various people from various departments for manipulating telecommunication call records 62 of a telecommunication company or may include various people associated with a telecommunication company. For example, there are computer programs 20 that are useful to users from a fraud department of a telecommunication company for manipulating call records 62 in order to detect any sort of fraud being committed by the subscriber 144. One reason the fraud department finds the call records 62 useful is because certain dialing patterns can be associated with an act of fraud. For example, a call record 62 showing that the subscriber 144 within the same cell site has called "time of day" and has repeatedly hung up as soon as the call was answered can be an indication of someone trying to clone the telecommunication device used to make the call to time of day. Whenever these types of calls occur at a higher the frequency there is a higher the likelihood that the caller was attempting to clone the telecommunication device and thereby committing an act of fraud.

Users from an engineering department associated with a telecommunication company may find the one or more computer software programs 20 to be useful. For example, the engineering users are provided with the ability to see not only what digits a subscriber 144 has dialed, but also to see what digits were actually pulsed out by the switch 58. For the engineering users, the computer software programs 20 for communicating and managing call records 62 provide a good troubleshooting tool.

The engineering users also can use the one or more computer software programs 20 as a billing validation tool when a bill is received from the telephone company. For example, without the one or more software programs 20, there is virtually no way to confirm the actual minutes of usage from zone office trunks. In a telecommunication system, the zone office trunks are the trunks where the cellular telephone ties into the telephone system. The one or more software programs for communicating and managing telephone call records 62 provide the engineering users with a means for validating a particular bill.

Users from a telecommunication system performance evaluation department also may find the one or more computer software programs 20 to be useful. For example, the system performance evaluation users can utilize the software programs 20 to determine the calls that were dropped by the system 56. They also can determine which site actually dropped the call. Furthermore, in some geographic regions, for example in South Florida, the system performance evaluation users are provided with a special telephone line, for example a *888 line, that employees of the telecommunication company can use. If an employee drops a call or has a problem with a call, they can dial *888 and leave a voicemail message regarding what the problem was. When the user checks the call records 62 the following morning, they can pull the records of the individual user, look for the *888 call, backup one call from that point and they have at their disposal a variety of information about the telephone that failed.

A market research user associated with a telecommunication company also may find the one or more computer software programs 20 to be useful. Market research users can use the one or more computer software programs 20 to conduct certain marketing related studies. For example, one such study uses a special telephone line, for example a *123 line, which is a real-time traffic report line installed in a specific geographic region. The market research users can, for example, advertise the *123 number by using billboards or other methods of advertising. The market research users can then run a study of the number of people that actually dial the *123 number within the region before and after the number was advertised and thereby measure the effectiveness of the advertising in that region. For example, the marketing users can determine if there was an increase in the number of calls made to *123 after the advertisement was put in place.

Users from a technical support department of a telecommunication company also may find the one or more computer software programs 20 to be useful. For example, the technical support users can rely on the one or more computer software programs 20 for troubleshooting purposes. Subscribers 144 may call into the central office and complain, for example, that they cannot dial out. What the one or more software programs 20 allows the user to do is to find out if the subscriber 144 has an invalid serial number, what digits the subscriber 144 is dialing and what digits the switch 58 is actually sending out to the switch-master 66.

Furthermore, the technical support users can use the software programs 20 for subscribers 144 that question the validity of their bill. For example, the subscriber 144 may call the central office in order to get credit for a number of telephone calls that had been dropped throughout the week. The one or more software programs 20 can provide the technical support users with a tool that allows them to go back and review how many calls were actually dropped during the week in question. Generally, if only two or three calls are seen as actually having been dropped, the technical support user may have grounds upon which to challenge the subscriber's 144 claim.

Users from a security department of a telecommunication company also may find the one or more computer software programs 20 to be useful. The security users can use the one or more software programs 20 when they work in conjunction with a government agency, for example, for processing court-ordered requests for call records 62 (described in detail below) and for detecting fraud within the company itself.

Users from a "911" department of a telecommunication company also may find the one or more computer software programs 20 to be useful. For example, the "911" group of users can use the one or more computer software programs 20 in order to validate which numbers were actually dialed out by the subscriber's telecommunication device or where the telecommunication company is connecting the subscriber 144 upon dialing "911."

In one embodiment, the switch 58 is in communication with the switch-master 66. As discussed above, the switch-master 66 is an electronic device that operates, generally, under the control of the UNIX operating system. The telecommunication company's billing department for collecting call records 62 uses the switch-master 66. From the switch-master 66 there also can be provided a feed 68 for tracking roamers 70, fraudulent activity 72 and other functions 74.

In one embodiment, there is provided a network 24 by way of a Local Area Network 24 (LAN) connection 145 from the switch-master 66 to the general-purpose computer 18 that enables the user to log into an account within the switch-master 66 and then execute a script 80 such that all of the billing records can be supplied back to the central office 77. Accordingly, the LAN connection 145 acts as a billing feed 145 that is in essence being routed back to the central office 77.

Within the switch-master 66, the script 80 is provided with enough intelligence that if the LAN connection 145 fails (e.g., falls off) the user knows the last call record 62 that was sent to the central office 77. Accordingly, in the event of a LAN connection failure there is virtually no loss of call records 62. In practice, the central office 77 collects about 99% of the call records 62 after a LAN failure, which is adequate for the intended purpose.

A server 16 can be connected to the system via the LAN. For example, there can be provided a database server 16 in communication with the network 24. For example, there can be provided an SQL server of the type discussed above. One embodiment of the LAN connection can be provided with an SQL database of the type manufactured by the MICROSOFT COMPANY, for example. Further, the general-purpose computer 18 can be in communication with the database server 16 over the LAN. For example, the general-purpose computer 18 can be dedicated to performing the specific functions.

Those skilled in the art will appreciate, however, that the instructions of the software programs 20 to be executed by the general-purpose computer 18 also can be executed by the database server 16. In one embodiment, the database server 16, for processing efficiency reasons, can execute the instructions of the software programs 20. The database server 16 can execute the instructions faster than the general-purpose computer 18. Those skilled in the art will appreciate that, in one embodiment, the system 56 can collect, for example, up to five million call records 62 per day.

One embodiment of general-purpose computer 18 can execute the instructions of a client software program 94 for carrying out the function of collecting call records 62 data. Accordingly, the client software program 94 for collecting such data automatically establishes the LAN connection 145 to the switch-master 66 and, in one embodiment, also can automatically log the general-purpose computer 18 into the switch-master 66. There can be provided enough intelligence in the switch-master 66 such that the switch-master requests a password change from a particular account attempting to access it. In turn, the switch-master 66 will recognize the password change transaction, generate a password and store it in a table 100 for future use. The system 56 maintains the current and any previous passwords.

There is also another computer software program 20 whose instructions can be executed by the general-purpose computer 18 ("DD_ALL" hereinafter). Such software program also can connect into the switch-master 66 automatically. There are other software programs 20 that are part of a suite of software programs whose instructions carry out the function of monitoring the execution of the other software programs 20. One instance of such instructions is executed for every switch 58 that is in the telecommunication system. For example, if a particular region requires three switches 58, there will be three instances of instructions of such a software program executed by the general-purpose computer 18. There also can be other instances of instructions of the software program for monitoring other locations, such as the master software program 90. Accordingly, if five locations were being monitored, then there could be a total of five instances of instructions of such software programs being executed by the general-purpose computer 18.

The master software program 90 monitors all instances of a software program that is currently executing on the system 56. The master software program 90 ensures that each instance is currently executing, that they are receiving call records 62 on a real-time basis and that there are no problems. If the master software program 90 detects that, for some reason, any one of the currently executing instances has a problem, or if it detects that the LAN connection 145 is down, the master software program 90 will stop the execution (e.g., close) of every instance of the software programs currently executing and it will then continually try to reinitiate the session.

In one embodiment, there can be provided a computer software program 20 whose instructions are executed to initialize the general-purpose computer 18. For example, if the general-purpose computer 18 reboots for any reason, the instructions of the initialization software program first executes instructions associated with the start software program ("NT_START" hereinafter), which resets all the tables 100 and places all memory variables into a known state. NT_START then turns control over to DD_RUN which, in turn, executes instructions associated with all the other software programs 20.

In one embodiment, there can be provided a computer software program 20 for monitoring the other software programs whose instructions are being executed. In one example, the monitoring software program is a master program 90 that can be executed on workstation 26, the server 16 or any general-purpose computer 18 connected to the network 24. The master software program 90 provides the functionality for allowing the user to see what the status is of all the other software programs 20 that are executing. For example, the user can monitor the last call record 62 that was received, the last time stamp that was received and how many minutes difference there are between the receipt of the last all record 62 and the current time and it provides the user with this information on a real-time basis.

The software programs 20 discussed above can use, for example, a MICROSOFT SQL server for manipulating data stored in the database 22. However, those skilled in the art will appreciate that other servers or database servers may be utilized without departing from the scope of the invention. The server storage device can be partitioned with about 120 or 125 Giga Bytes of storage in accordance with the needs of the current implementation, which will generally depend upon the telecommunication market or geographic region being served. Furthermore, there are many stored computer software programs and data administration processes that take place within the database server 16. One embodiment of the database server 16 operates on a standalone basis and does not require an operator to watch it. For example, if the database server 16 runs into any problem that it cannot resolve on its own, it will broadcast a paging signal or send an electronic mail (e-mail) message to the user or other authorized person.

One embodiment of the computer software programs 20 also can perform additional procedures. For example, the software programs 20 can perform database cleanup and maintenance. Furthermore, because telephone call records 62 are being kept for extended periods, for example, 10 to 13 weeks worth of information is kept, the software programs 20 also can take the oldest call records 62 and remove them from the database 22. In other words, instead of saving the oldest call records 62, they are removed from the database 22 and the database 22 is maintained on a rolling 10 to 13 week basis depending on user-selectable options. Those skilled in the art will appreciate that the general-purpose computer 18, the workstation 26, the shared server 14 or any other computer that is in communication with the database 22 may execute the above cleanup and maintenance software programs.

There are other functions that can be performed by any one of the computers in communication with the database 22. For example, software program instructions for carrying out the function of accessing tables 100 stored within the database 22 can be executed in the background, while a wireless paging signal is broadcast to a user after the occurrence of certain predetermined conditions, for example how far behind the system 56 is running. There can be embedded in the paging signal information regarding how far behind the process is running, thus making it possible for the user to investigate the problem. Those skilled in the art will appreciate that the user can perform virtually any function from a remote location that the user is able to perform while directly operating the general-purpose computer 18. For example, the user can take an IPS pager and instruct the device to perform certain functions from a remote location. However, it should be noted that the database server 16 generally attempts to fix any failures that are encountered by it. If the database server 16 cannot repair the failure, it will broadcast a wireless paging signal or send an e-mail message to the user.

In one embodiment, two different types of telephone call records 62 are being collected depending on the particular switch 58 being used. For example, if the LUCENT (AT&T) switch is being served, 26 fields of billing data are collected. If the ERICSSON switch is being served, then 62 fields of data are collected. Those skilled in the art will appreciate that LUCENT and ERICSSON are manufacturers of telephone switches 58. The scope of the invention, however, should not be limited to the operation of the specific switches 58 provided as examples herein.

Also, data collection from each switch type can vary based on the data that are deemed necessary. For example, from the ERICSSON switch every field that is outputted by the switch 58 is collected. On the other hand, from the LUCENT switch only the fields that are deemed to be necessary are collected. There are certain fields that are not collected.

The types of fields that are collected include, for example, the originating number of the telecommunication device, the number called by the telecommunication device, voice channel seizure time, voice channel seizure date, the duration of the call, the cell location of the call, the facilities that the call went on and any features that the subscriber 144 may have used. In addition, there is a considerable amount of failure data (discussed above) that is collected from the system 56. Furthermore, there are fields that identify whether the call was an international call and whether the call was answered on the other end. It will appreciated that this list of fields is not exhaustive and the invention is not intended to be limited in scope thereto.

In one embodiment, several layers of network 24 security can be provided. For example, a first security layer can be provided when a user actually dials into the network 24, accesses a general-purpose computer 18 and logs into the network 24. Once the user has logged into the network 24, the user can execute instructions associated with a limited number of software programs 20 residing on the network 24. With few exceptions, the user will generally execute instructions associated with the software programs 20 on the network 24 in "read only" mode. However, if the software program 20 is of the type that would yield sensitive information, another security layer can be provided to prevent the user from accessing the sensitive software program even in read only mode. If the user does request access into the system 56 a separate account can be established for the user within the database server 16. Once the account is established, upon executing the instructions, the system administrator will know the user's identity and the location from which the user logged in. Accordingly, if the user matches any predetermined values set in a stored table 100, they will be given access into the system 56.

In one embodiment, the user generally performs three different types of searches. For example, the user can search by mobile telecommunication device number, by telecommunication device serial number or by the particular digits dialed by the telecommunication device. Because many fields are collected by the system 56 there are additional reports that can be provided for the user on a manual basis. However, in order to provide such functionality, there is an element of caution that must be exercised. For example, if a user attempts to perform a nonexistent function or a function that is not indexed in the database 22, the query may take forever to perform and may very well bog down the rest of the system 56. Searching and access speed are aspects to be taken into consideration because of the large quantity of searchable records that are stored within in the database 22.

In one embodiment, the user is forced to look at the current date and then, by way of option buttons, the user can look, for example, at the current day, the current week, two weeks back, four weeks back, and so on. The user also has the option of selecting a particular date.

Following is a description of the computer process steps from the time the subscriber 144, or caller, hangs up or terminates a telecommunication transaction. Also described will be one method of parsing the call records 62 into fields comprising the call records 62 as received by the switch 58. Furthermore, several representative computer software programs and their operation will be described.

1. Process Steps from the Time a Subscriber (Caller) Hangs Up

Once the subscriber 144 hangs up, for example terminates a telecommunication transaction, the system 56 collects the call record 62 for that particular call. The call record 62 is then sent to the switch-master 66. The switch-master 66 sends the call record 62 to the DD_ALL software program (discussed above) in the general-purpose computer 18 for further processing. The DD_ALL software program carries out instructions for receiving the raw call record 62 from the subscriber telecommunication device and passes the information within the call record 62. Once the instructions associated with the DD_ALL are executed it continuously executes instructions and waits for the call records 62 to be received by the switch-master 66.

In one embodiment, there are provided two different ways of receiving the call records 62. For example, in the LUCENT switch, the call records 62 are always obtained in real-time. In other words, as soon as that subscriber 144 hangs up or terminates a telecommunication transaction, that call record 62 is made available to the switch-master 66, it is sent to the general-purpose computer 18 and it is parsed by the general-purpose computer 18 and it is then sent to the server 16 for further manipulation or storage in the database 22. In the ERICSSON switch, the call record 62 is not actually obtained by the switch in real-time as is the case for the LUCENT switch. Rather, the call records 62 are sent directly to a buffer, which is filled with the incoming call records 62. Once the buffer becomes full, all of the records 62 in the buffer are sent to the general-purpose computer 18 for parsing and are then sent to the server 16 at one time. In one embodiment, the call records 62 can be sent at predetermined time intervals instead of when the buffer is full. For example, regardless of the status of the buffer, the call records 62 can be sent to the general-purpose computer 18 every 15 minutes or so. Therefore, depending on the specific set-up, the call records 62 can be sent to the server 16 approximately 15 minutes or more behind real-time as they are retrieved from the ERICSSON switch. It is to be understood that this is a limitation of the functionality of the particular switch 58 being employed and is not a limitation of the software program. Accordingly, the scope of the invention should not be limited thereby.

Once the call records 62 have been received by the switch-master 66 and parsed by the general-purpose computer 18, they are sent to the server 16 and they are stored in a database 22 storage device, which is in communication with the server 16. In one embodiment, the call records 62 are stored in several different tables 100 for access speed purposes. For example, there can be provided an hourly table 100 in which call records 62 are stored, which are obtained during the peak periods of the day. Furthermore, there can be provided special tables 100 set-up for the evening, nights and so on. In a further example, the call records 62 can be inserted into weekly tables 100 for access speed purposes. Those skilled in the art will appreciate that in order to insert call records 62 into the database 22 efficiently, the smaller the table 100 the quicker the task can be accomplished. In one embodiment, the searches and all the stored computer software programs that the user can access, are provided with enough intelligence to know whether they have to search the various records tables 100. For example, whether they have to search through the hourly records, the weekly records and so on. That information is also stored in a storage device in communication with the server 16.

2. Parsing the Call Record Fields

Figure 7B:
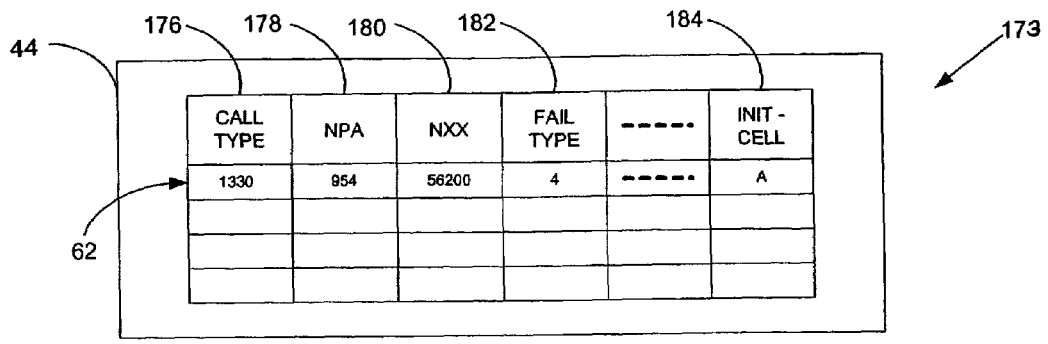
FIG. 7B illustrates one embodiment of an output display of a table.
Figure 7A:
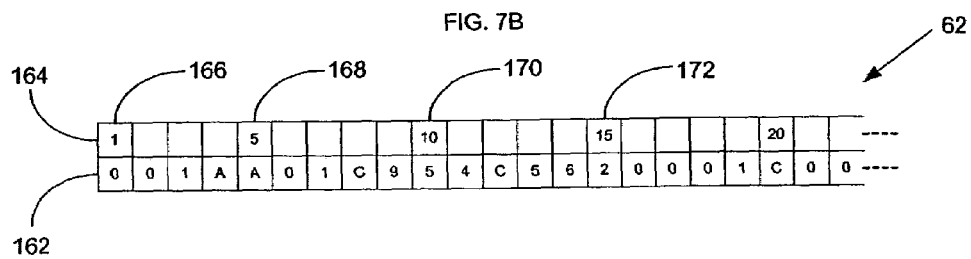
FIG. 7A illustrates one embodiment of a representation of a call record of a telecommunications system.

Referring now to FIG. 7A, where one embodiment of an example of a raw call record 62 is shown. It will appreciated by those skilled in the art that the various fields comprising the call records 62 can be parsed in accordance with the switch 58 manufacturer's specifications. For example, the switch 58 manufacturer can provide documentation illustrating what the actual raw call record 62 should look like. For illustration purposes, the call record 62 will be described by referencing the individual characters 162 and their relative position 164. For example, the first character position 166 is where the parsing process begins. Accordingly, the parsing process continues character by character sequentially through the call record 62 at positions 168, 170, 172 and so forth.

The call records 62 are received by the switch-master 66 in sequential order on a continuous basis. In one embodiment, the parsing process will begin at a predetermined field 166 of the call record 62 and will first determine the beginning or the starting point of the raw call record 62. Those skilled in the art will appreciate that the software program may obtain the necessary information required for parsing a call record 62 from a file accessible by any one of the network 24 components. Accordingly, the starting point may be defined as a character "0" that begins at position 166. In one embodiment, there is a table 100 stored within the server that defines where the initial position is located. For example, the starting point may be defined as position five 168 of the call record 62. Furthermore, position ten 170 of the call record 62 may be defined as being the starting point for the area code of a mobile telephone number. Moreover, the table 100 may further provide that the position 15 of the call record 172 is in excess of the user's NPA and so on. Accordingly, once one full call record 62 is parsed, the parsing process will begin searching for the starting point of the next call record 62. From that point on, the parsing process knows that regardless of the call record 62 presented to the general-purpose computer 18, it will merely add five to the starting position and retrieve the NPA and the parsing process is repeated for all the remaining call records 62.

Those skilled in the art will appreciate that the definitions of the specific call records 62 can vary depending on the switch manufacturer. For example, the ERICSSON switch call records can have a different definition than a LUCENT record and, accordingly, there may exist several definitional tables 100 that describe the various records. The table 100 structures can be different for each switch manufacturer's call records 62 format and this information is sent to the server 16.

FIG. 7B illustrates one embodiment of an output display of a table shown when the user executes or runs a particular query. Accordingly, the user sees a grid 173 or a matrix within the display 44 output screen. Within the grid 173 the user sees the various information illustrated. For example, there can be a call type 176 or there can be an NPA 178, the dialed number (NXX) 180, the failure type 182, the initial cell site 184 that the call originated from, and the like. As illustrated in FIG. 7B, the user will actually see one or more particular call records 62. The software program then takes this one step further and color-codes the grid 173 so that the user can look at it and at a glance will be able to determine which call records 62 are incoming records, which call records 62 are outgoing records, which call records 62 are tandem records, which call records 62 are slave records and so on. Those skilled in the art will appreciate that the user can access the call records 62 by clicking on any one of the records identifiers on the grid 173 displayed on the screen. Accordingly, the selected call record 62 is expanded and shown in a more detailed form. The more detailed form of the cell record 62 can show, for example, the call type 176 rather than the dialed number NXX 180, the originating call or the terminated call. The system can take many of the call records 62 fields and parse them into text that the user can read.

For example, there may be a field for the failure type 182 having a number four within the call record 62 field. Because the number four does not reveal much information about the failure type 182, the user can expand the field associated with the failure type 182. A failure type such as that a call was dropped will appear on the grid 173. Further, if one of the fields for the initial cell 184 is displayed, this may tell the user that the call was originated from cell A, for example. The software program provides an additional button for the user to click on for expanding that information and return to the main database 22. From there, the user is provided with information about that particular cell. For example, the user is provided with information about where the cell is located, its latitude, its longitude and its address. Furthermore, the user can be provided with information about what phase on the cell the call was placed on. Moreover, the user can be provided with the path through the switch 58 and what hardware was used during the call. The software program is thus a useful troubleshooting tool for the user.

For example, slave records are used in the LUCENT switch implementation. Slave records are created if there is more than one switch 58 from which the subscriber 144 originates a telecommunications transaction. Accordingly, a master call record is created for that transaction. For example, as the subscriber 144 drives on a highway, their cellular transaction will be handed off from one switch 58 to another switch 58' as the subscriber 144 travels across cell boundaries. Accordingly, a slave call record 62 is created within the other switch 58'. In general, the billing department normally discards the slave record. However, in one embodiment, the slave record can be maintained in a storage device associated with the database 22, which is in communication with the network 24 or server 16. In general, the slave records can be kept because each one provides information such as the identity of the telecommunication device, the first cell site from which the transaction originated and the last site from which the transaction terminated. Therefore, the user knows the site from where the subscriber 144 initiated the cellular transaction and the site from where the subscriber 144 terminated the transaction. Those skilled in the art will appreciate that a slave record exists for each new switch 58 that the subscriber 144 is handed off to as he or she drives on.

The billing department may use the slave record in billing if they are part of a different entity and there is an agreement in place between the owners of the different switches 58, 58'. Accordingly, there is a now a means of billing back for how many minutes a call was on the other switch 58' and so on.

3. Representative Computer Software Program Applications

In one embodiment, there can be a plurality of instructions associated with a plurality of software programs executing in VISUAL BASIC Version 5 or 6 throughout the system 56, for example. The general-purpose computer 18 initially executes the instructions of a software program ("DB_LIDE hereinafter) in order to carry out the function of establishing a communication connection between the general-purpose computer 18 and the server 16. The instructions are provided in native code of the general-purpose computer 18 directly to the server 16. The DB_LIDE program does not go through an Open Database Connectivity (ODBC) and provides an efficient way of accessing the server 16.

The general-purpose computer 18 executes instructions associated with a software program ("NTSTART" hereinafter) when the general-purpose computer 18 is initially booted up for carrying out the function of resetting all tables and memory variables to a known state and then beginning the execution of instructions associated with another software program, DD_RUN, for example. The tables 100 are predefined and there is a special table 100 that tells the NTSTART program what to expect at various fields and where within a call record 62 the fields are located. This is done in the event a new field is added or if a field is merged or contained within another field. If such an event occurs, rather than editing the software program instructions code, only the table 100 needs to be modified and the change will automatically be picked up.

The DD_RUN software program initially looks at a table 100 and then determines what the status is of each child software program 92 that is executing. When the system is initially booted, DD_RUN sets every child software program 92 to an out of service state. After it checks the status of the child software programs 92, the DD_RUN software program executes a loop through a table 100 and for every software program that is out of service it will execute instructions associated with the DD_ALL program or the DD_ALL_E program. Those skilled in the art will appreciate that the basic difference between the DD_ALL and DD_ALL_E programs is that one is utilized for a LUCENT switch implementation and the other is utilized for an ERICSSON switch implementation. Accordingly, certain functionality within the two software programs can be different. Those skilled in the art will appreciate that these software programs are described as examples of one embodiment of the invention and should not be construed as limiting the scope of the invention.

The DD_ALL and DD_ALL_E programs can, however, share some tables 100. For example, they can share employee tables 100, status tables 100 and they can write to certain common status tables 100. Although the information written to the tables 100 by each program may be somewhat different, these example programs write information to the status table 100 at approximately 30-second intervals. That is one way of determining how far behind real-time the actual program is running. For example, that is how the DD_RUN program knows whether or not all the other programs are executing instructions in a proper way. The DD_ALL and the DD_ALL_E programs also set a sanity bit. For example, these programs write a known number to a table 100 and then constantly increment that number. The current program looks at the numbers knowing what the previous number was. If the number has not changed, the program suspects that something went wrong and will begin watching it more frequently. If the number stops changing, the program will shut down or interrupt the execution of instructions associated with the current program.

Those skilled in the art will appreciate that it does not matter whether the shut down request comes from DD_ALL or DD_ALL_E. For example, a specific table 100 can be initiated by the program and within that table 100 certain information can be stored therein such as the host switch 58, the server 16 and one or more sanity bits for monitoring purposes. There may be one or more host switches 58. For example, one switch-master 66' may be called by one name, and another switch-master 66' may be called by another name. Accordingly, about every 30 seconds the current program checks and monitors the status of the table 100. Its function is to ensure that everything is executing properly.

The DD_RUN program continuously checks to determine if the sanity bits are constantly changing. The checks let the user know that the child software programs 92 are actually executing instructions and writing information to the tables 100. The DD_RUN program also looks at all the status fields. If they are all active, the program continues execution. If it detects that one of the child software programs 92 is marked out of service, the DD-RUN program will find out because it will know what the host switch 58 is and what the name of the child software program 92 is. The user can select which software program instructions to execute. It knows what to expect and it will send a command such as "DD_ALL.EXE NAME ONE," to initiate the execution.

Accordingly, the program knows when it boots up that this is what it will be connecting to. Again, this process is repeated, for example, about every 30 seconds. Those skilled in the art will appreciate that if the DD_ALL and the DD_ALL_E programs shut themselves down, they will mark the table 100 out of service prior to doing so. Accordingly, as DD_RUN loops about every 30 seconds or so, it checks the sanity bits and status of these software programs on a real-time basis.

Those skilled in the art will appreciate that because there are separate parallel feeds 142, 142' provided from the LUCENT switch 58 and the ERICSSON switch 58' there are generally no conflicts or simultaneous data transmission errors or collisions that can occur. For example, if the subscriber 144 generates a call record 62 at a 10:05 a.m. at the LUCENT switch 58 and at the same time the ERICSSON switch 58' sends a call record at 10:05 a.m., there are no conflicts because the server 16 runs multiple processors, for example the server 16 runs four parallel processors, and it is fast enough to distinguish the two events. Furthermore, the information received from the switches 58, 58' gets buffered and every call record 62 is marked with a specific time stamp. Therefore, if two switches 58, 58' located in the same region send call records 62 to the same switch-master 66 and onto the system 56 substantially simultaneously no data collisions will generally occur. If two subscribers 144 from two separate switches 58, 58' terminate transactions at the same time, both call records 62 will be sent to a common switch-master 66 and the switch-master 66 will send the call records 62 to the system 56. The call records 62 may be provided in a different time sequence, for example, one record may arrive at time 0.1 and one may arrive at time 0.12, but the information will not be lost.

Accordingly, as both call records 62 arrive at the system 56, one of them may get recorded as record number two followed by record number one, even if there is a time difference of three minutes between the two records 62. In one embodiment, the tables 100 are built by indexing the entries sequentially according to the time stamp given to the call record 62. Therefore, even though a subsequent record is received three minutes later than a previous record, it will be inserted in the table 100 in the order in which it was time stamped. Accordingly, the earlier time stamped call record 62 will be the first call record entered into the table 100. Furthermore, there is enough intelligence provided within the network 24 between the server 16 and the switch-master 66 and between the executive control processors (ECP) 64 that there generally will not be a collision of two call records 62.

As the DD_RUN program continually checks the sanity status, the system 56 performs a real-time status. Accordingly, as the instructions for the various software programs begin executing, there are certain initialization files for the system 56 to consider. For example, one such file is the dialed digits file ("DIGITS.INI" hereinafter). The DIGITS.INI file defines the server 16 location and, in essence, the system 56 can monitor and execute instructions associated with one or more programs 20 from one location to multiple database servers 16 such as SQL servers. The DIGITS.INI file can generally define the server 16 location and how long to wait for the sanity failures. In one embodiment, for example in the LUCENT switch, the sanity check wait period is set to 15 minutes. Accordingly, if the system 56 does not receive any call records 62 within 15 minutes, it will shut itself down and reboot. The system 56 will assume that connectivity was lost or that something else went wrong. The sanity check wait period value can be set, for example, for a worst-case scenario. In some implementations, the worst case may be to get one call every five minutes or every 15 minutes. Accordingly, the sanity check wait period value can be set a bit higher than the worst-case scenario, in case the worst-case scenario actually happens.

A variety of reasons exist why call records 62 are not received by the system 56. For example, there may be a problem with the switch-master 66 or perhaps the switch-master 66 may be running a batch process and the system 56 is low on the overall priority list. For example in the ERICSSON switch implementation, the sanity check period is set for 60 minutes. One reason for setting the sanity check period to 60 minutes is because the ERICSSON call records 62, as discussed above, are not received by the switch-master 66 on a continuous basis, but rather, they are buffered and are sent either when the buffer is fall or within about a 15 minute period. Those skilled in the art will appreciate, however, that the call records 62 do not have to be sent every 15 minutes and can be sent approximately every 30 minutes depending on the specific implementation. Nevertheless, if the sanity check period expires, the system 56 will shut down and reboot.

There is another software program whose instructions can be executed by the server 16. This software program checks the status table 100 approximately every few minutes. If the process notices that the sanity period has expired and that the system 56 has rebooted, it will execute instructions to broadcast an IPS paging signal to a wireless telecommunication device, send an e-mail message to the user, and send the user a network message at the specific network station that the user is logged into. One reason for this implementation is that, theoretically, one could shut down one software program, bring it back up and fifteen minutes later shut it back down again and bring it back up and so forth. This is a good indication that the link between the server 16 and the LAN is down, that the link between the server 16 and the switch-master 66 is down or that perhaps the link between the switch 58 and the switch-master 66 is down. Accordingly, sending a notification by way of a paging signal, e-mail or network message whenever a reboot condition exists will alert the user that something has gone wrong in the system 56.

Those skilled in the art will appreciate that any data received between the shutdown and restart periods are buffered within the switch-master 66 buffers 174, 174'. Whenever the system is shut down the switch-master 66 knows that the general software program is shut down. This occurs because the LAN connection may have been dropped and the TCP/IP session may have been dropped. Accordingly, the switch-master 66 knows that it no longer has a place to send its information and maintains a pointer to continuously buffer the incoming call records. As soon as a connection is reestablished and the user logs in, the system sends a script to the switch-master 66 to send call records 62 and the process restarts right where it had left off.

There is also an additional field that can be set. For example, the user may not want to go through the cycling process because it is already known that a major catastrophic failure has occurred in the system 56 and the user does not want to tie up traffic. Accordingly, the user can set a specific field that tells the software program to ignore a host switch 58. Therefore, if it sees that it is out of service, it simply ignores the host switch 58 and does not honor the request.

The DD_MON software program provides the user with a real-time summary of system 56 activities. It also provides the user with a number of call records 62 that are currently stored in the system 56 database 22. The DD_MON program shows the user the number of call records 62 that were inserted into the database 22 per second. At a glance, it can show the user all of the child programs 92 that are executing and other processes that are executing. It also provides to the user a time stamp of the last call record 62 and when the child program 92 actually made the entry. For example, by looking at every time the child program 92 writes to the table 100, it writes not only what the current time is but it also writes what the current call record 62 is. Therefore, by glancing at the table output grid 100, 173, the user can tell whether the current time is recent or whether it is actually writing to the table 100. Furthermore, the user can tell how far behind the system 56 is in parsing call records 62 and how many call records 62 it is processing per second or per hour based on current activity.

If a software program is executing behind schedule, the data received from the switch-master 66 will be buffered in buffers 174, 174'. For example, between the switch-master 66 and the server 16, the programs communicate with each other while they send call records 62. Accordingly, if the information is arriving too quickly the server 16 will talk to the switch-master 66 and slow down the information transfer rate by storing the call records 62 in the switch-master buffer 174. Once the buffer 174 is full, a signal is sent back by the switch-master 66 requesting that the switch 58 stop sending call records 62 until the server 16 finishes processing the current call records 62. Generally, the system 56 falls behind because either the call records 62 being collected are behind schedule or because the system 56 has been shut down, and after it has resumed operation, the system 56 is trying to catch up on all the call records 62. Those skilled in the art will appreciate that in some instances, the server 16 can actually process over a million records an hour. However, a normal transfer rate is roughly four to five million records per day. The system 56 will generally not receive that kind of volume all the time unless the system 56 is trying to catch up from a prior shut down condition.

Because the example four or five million records can be spread out, for example, over a 24 hour period, if one of the software programs 20, for example the switch-master program 90, has a problem and the system 56 is not receiving call records 62, the call records 62 are stored in the switch 58 itself because the switch-master 66 instructs the switch 58 to hold up and not to send any more call records 62. It may take, for example, a day before the whole problem is resolved. Therefore, once the system 56 is re-started, it could be 24 hours behind schedule and it will then attempt to send call records 62 from the switch-master 66 to the server 16 as fast as it can in order to catch up with the call records 62 transfer process.

When the user initially executes the DD_MON program, the user will generally receive a message of the day. The message of the day informs the user of how far behind in real-time processing the system 56 is running on each switch 58. In addition, the message informs the user whether the system is going to be available or if there is an upcoming event.

Another program whose instructions are executing is called DD_QRY. This program provides the user interface to the system 56. Accordingly, DD_QRY allows the user to query the database 22 on the basis of a device number, serial number or dialed digits. For any queries beyond those listed above, the system 56 generates a report for the user, but the user will generally not be given access to the report because of performance issues. There are several reports that are automatically generated on a monthly or a weekly basis that are useful to some users. For example, the market research user may wish to receive a monthly report in order to keep track of how well the real-time traffic program features are actually working. For example, the system can provide the market research group with information such as how many people are dialing a particular number such as 611 for customer service. In addition to the number of people that called a particular number, the system 56 also can provide additional reports such as how long the subscriber 144 stayed on the line. Also, reports can be provided for how long the telephone rang before it was answered. Furthermore, other reports also can be provided. For example, on a weekly basis a report can be generated showing who called 611, how long the telephone rang and how many seconds elapsed before the telephone was answered and once the telephone was answered, how long the callers were kept on the phone.

The data that provided for the reports are generated from the call records 62. Therefore, in the above example, the system can request all call records 62 showing that the subscriber 144 dialed 611. Once the system 56 has obtained the call records 62, the report breaks down the records 62, adds them together and summarizes them. The system 56 also can provide a list of all calls that experienced a particular failure at a particular site. This can be done, for example, through a program based on the billing record or it can be done through a program that actually looks at telephone call record 62 failure data from the switch 58 from a different feed.

The DD_QRY program also allows the user to generate reports. There are canned reports that show only the fields that would be of interest to most users, such as the type of call, the telecommunication device identity, numbers dialed, the cell the telecommunication device was in, the time stamp, the duration of the transaction and the like. Furthermore, the program also can take the particular report and the duration, and increment it to the next minute. The user can thus retrieve billing information and know what the interval of that specific bill was. Also, the user can input or specify the start of the report and the end of the report and determine whether the number of minutes that is shown is approximately the same as what is indicated on the bill. Accordingly, the user can use the DD_QRY application as a validation tool for the bills.

As discussed above, two other programs that also may be executing in the system are DD_ALL and DD_ALL_E. These programs generally establish a TCP/IP communication session, log onto the host switch 58, request call records 62, parse the call records 62 and provide them to the server 16. Those skilled in the art will appreciate that the server 16 where the call records 62 are provided does not have to be located locally. For example, the call records 62 can be stored remotely and can be retrieved from across the network and then they can be stored locally on the server 16.

As another example, the DD_QRY program can provide the user with the option of querying the database 22 based on various fields such as, for example, a table 100 field called "market" or "host." The market field provides the user with the location of specific markets and the geographic region served by the market. The host field includes a number representative of the particular host switch 58. If the user has the host switch 58 number, the user may execute the query based on the specific host. Accordingly, the software program will provide all of the records that correspond to the specific market or host.

In one embodiment, the initialization file provides the user with the markets to present to the output device, and it also provides the user with information on which server 16 they reside on. Certain markets located in particular cities may reside on a server 16 that services a specific region. All the PCS markets of one city, for example, may reside on the server 16 located in another city. Accordingly, once the server 16 in a different city comes online, the program will transfer all the call records 62 from one city to be stored in the server 16 located in another city. For example, if a request comes from Orlando, the program will transfer the telephone call records 62 from a South Florida server 16 to an Orlando server. In order to provide the previous region with access to the same call records 62, the user can select the initialization file and will be provided with instructions as to how to access a server in a different city, for example a server located in Tampa, in order to retrieve those call records 62. Accordingly, the user can access the call records 62 from a server 16 that may be located in different regions throughout the country without noticing any difference in performance.

One embodiment of the software program provides the ability to export the call records 62 for use by other general-purpose computer software programs. For example, the program can provide the ability to export the call records 62 for use by a spreadsheet, such as MICROSOFT EXCEL.

In one embodiment, there are provided a number of tables 100 that are reserved for security purposes. The system knows what the individual user's rights are, for example, whether they have user rights or administrative rights. The system 56 is also capable of providing real-time telecommunication transactions at the various cell site locations. Accordingly, the user can determine how many transactions originated from a particular cell. As discussed above, the DD_RUN program also provides a summary of this information in terms of database 22 inserts per second or database 22 inserts per hour. This information can be provided for a combination of switches 58 or on a per switch 58 basis and the user can generally determine which switch is the heaviest one in use at the time.

In addition, there are about 20 or more scheduled tasks or programs whose instructions are executed on the server 16 for carrying out the function of cleaning up data used for monitoring status. These tasks execute weekly maintenance and daily maintenance routines, which include inserting records from one table 100 into another table 100. The weekly maintenance includes dropping the previous week, waiting and rotating the tables 100. It also provides summary information, keeps track of how many call records 62 are stored in the server 16, how many call records 62 are in each table 100, how many people have actually used the program, who has used the program and so on. It is not intended that the invention be limited in scope to the tasks enumerated above. Other functions that can be performed by the system 56 including functions that execute instructions for ensuring that database 22 indexes are properly built. If any of those functions fail, the system 56 sends a paging signal, an e-mail message or other similar warning signal to the user.

C. Surveillance System for Call Records Requested Through Court Orders

The surveillance system for call records requested through court orders allows the user to send specially formatted electronic mail (e-mail) message to a predetermined account configured for receiving court-ordered call records surveillance activation information. At scheduled intervals (generally once per day) court-ordered call records surveillance requests are collected from a distributed database management system 56. The requests are then sent by way of facsimile transmission to a predetermined account at an agency for handling the call records 62 associated with the court-ordered requests. Copies of the call record 62 requested by the court order can also be sent by way of facsimile transmission or can be sent by way of e-mail to the originating party ("originator" hereinafter) of the court-ordered request. The originator of the court-ordered request could be, for example, a telecommunication company. Those skilled in the art will appreciate that the call records 62 requested through court orders can be sent by way of e-mail and can be provided in a spreadsheet format. For example, such requests can be provided in a MICROSOFT EXEL spreadsheet format, or other well-known spreadsheet programs.

Figure 10:
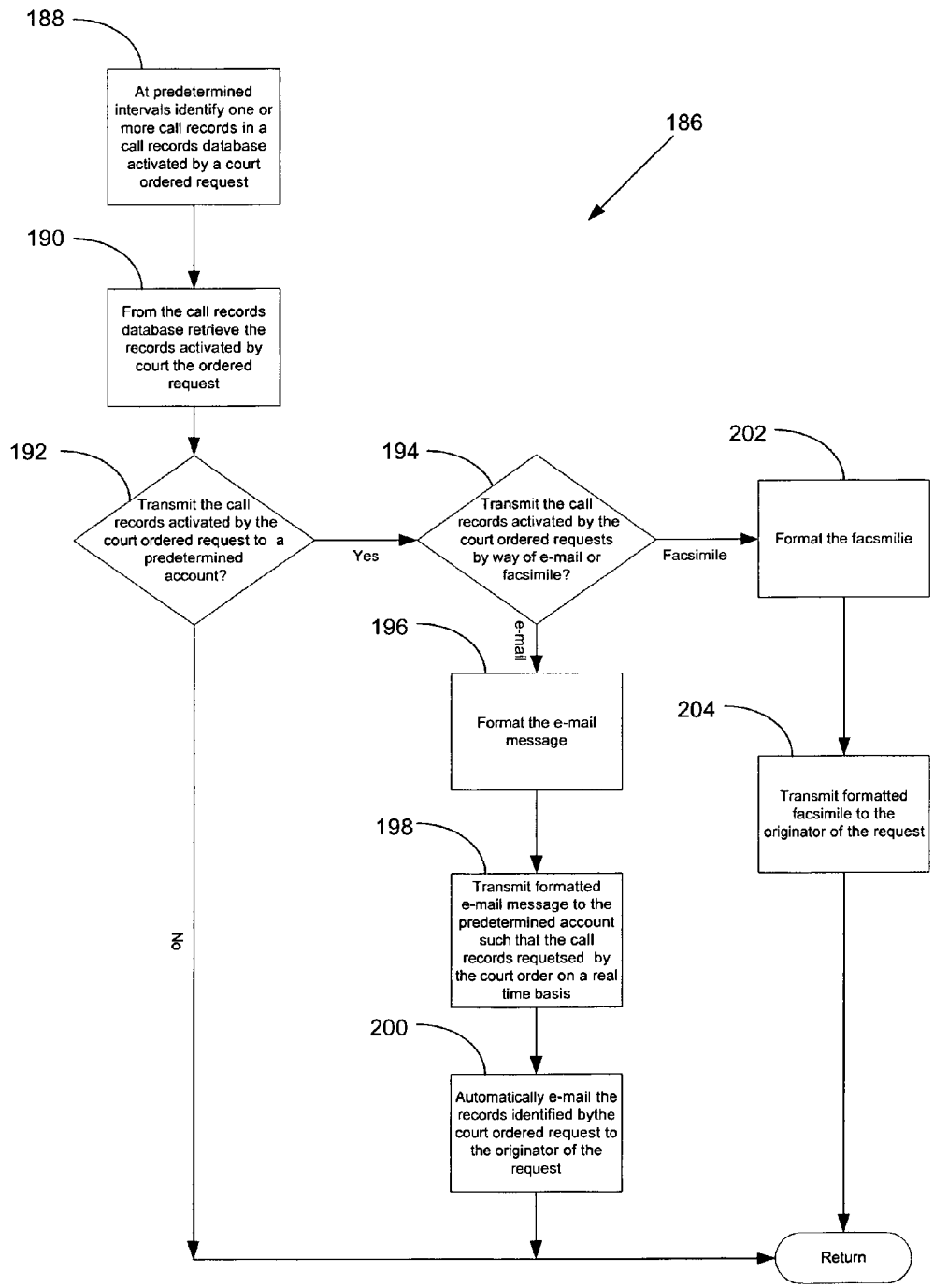
FIG. 10 illustrates one embodiment of a logic flow diagram for processing court-ordered surveillance information.

Turning now to FIG. 10, where one embodiment of a logic flow diagram of a method for managing call records 62 requested through court orders is shown in diagram form. The logic flow diagram 186 of a method for managing call records 62 requested through court orders begins at block 188 whereby at predetermined intervals one or more call records 62 are identified in a call record database 22. At block 190, once identified from the call records database 62, the call records 62 identified by the court-ordered request are retrieved. At decision block 192, it is determined whether the call records 62 requested are to be transmitted to a predetermined account. If the call records 62 are to be transmitted to a predetermined account, at decision block 194 it is determined whether the court-ordered call records 62 are to be transmitted by way of e-mail message or facsimile. At block 196 if the court-ordered call records 62 identified in the call records database 22 are to be transmitted by way of e-mail, the e-mail message is formatted. At block 198, the formatted e-mail message is transmitted to the predetermined account such that the predetermined account receives the court-ordered call records 62 on a real-time basis. At block 200, the e-mail message is automatically sent to the originator of the court-ordered request for call records 62. If at decision block 194 it is determined that the court-ordered call records 62 are to be transmitted by way of facsimile, at block 202, the facsimile is formatted and at block 204 a copy of the formatted facsimile is transmitted to the originator of the court-ordered request for call records 62.

Figure 11A:
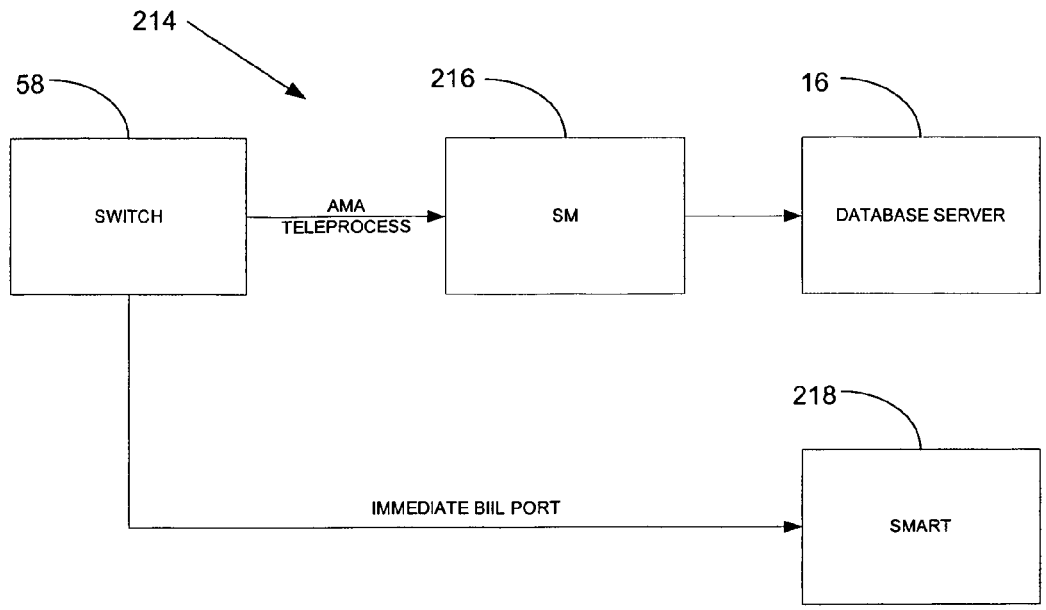
FIG. 11A illustrates a related art system for processing court-ordered requests.
Figure 11B:
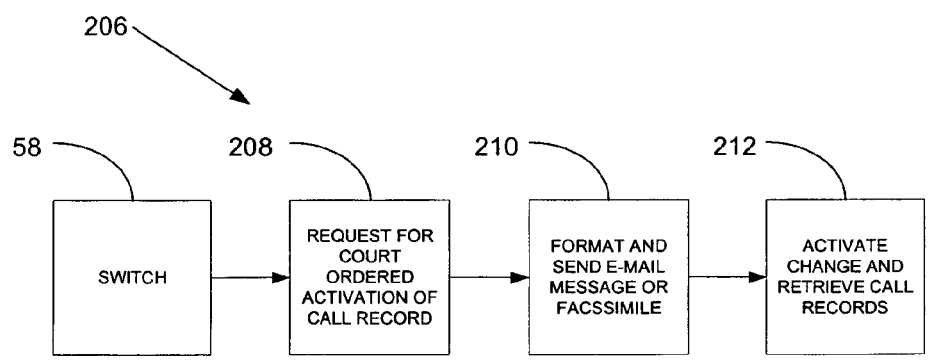
FIG. 11B illustrates one embodiment of a system for processing court-ordered requests.

As illustrated in FIG. 11B, one embodiment of the system 206 for managing call records 62 requested through court orders generally sends all records 62 associated with active court-ordered requests. It also can check the start and stop dates of specific court orders prior to sending the call records 62. At block 208 a request to activate certain call records 62 through court order is received from the switch 58. Once the request to activate certain call records 62 is received, at block 210 the system generates and formats an e-mail message and a facsimile. The e-mail message and the facsimile are then transmitted to the originator of the court-ordered request, for example. Once the e-mail and facsimile have been transmitted, at block 212 the system 206 activates the change in the call records 62 database 22 and begins retrieving call records 62 that have been requested by way of court order. Previously this was done by manually inputting the messages into the switch on a daily basis. For example, in the system 214 of FIG. 11A, a switch manager 216 would request the records daily from the switch 58, manually process the records by way of facsimile transmission to the government agency, and store the records in a database server 16. The system 214 also includes a SMART application 216 for receiving billing information for an active court order.

The user has the capability of sending a specially formatted message to a predetermined account, which is then automatically sent by way of e-mail to the originator of the court-ordered request for call records 62. Mobile telephone call records 62 that are to be processed in accordance with court-ordered requests can be maintained by the system 56 for a predetermined period. For example, such call records 62 can be maintained beyond the normal storage interval generally provided by the distributed database management system 56. The court-ordered request for call records 62 surveillance system 206 can utilize the distributed database management system 56 for retrieving the call records 62 and the server 16 for processing and forwarding the required call records 62 to the predetermined account and to the originator.

For example, the system 206 can use a MICROSOFT SQL server for such a purpose. The automated court-ordered call records 62 surveillance system 206 provides automated distribution of landline, wireline and mobile telecommunication call records 62 that are requested by way of court orders. In one embodiment, the court-ordered call records 62 surveillance system 206 utilizes computer software programs and tasks that execute on a MICROSOFT SQL server. Those skilled in the art will appreciate, however, that equivalent database servers 16 can be utilized without departing from the scope of the invention.

In one embodiment, a means for communicating with the surveillance system 206 includes communicating by way of formatted e-mail messages. Described below is one embodiment of a system, method and apparatus for adding, changing or deleting a call record 62 associated with a court-ordered request along with an explanation of one example of the tables 100 and computer software programs for implementing the function.

In use, telephone call records are retrieved from the switch 58. The distributed database management system 56 maintains the call records 62 in a protected location to prevent the call records 62 from being deleted during normal database 22 maintenance. Call records 62 associated with active court orders are generally sent by way of facsimile transmission on a daily basis to the government agency that requested the call records 62. Failed facsimile transmissions can be resent periodically as defined by the user. For example, periods may be set as, for example, hour-long up to a specified time such as, for example, noon. A status report can be sent twice daily to the individuals responsible for requesting call records 62 requested by way of court orders detailing which court orders are active and whether or not the call records 62 were successfully transmitted to the appropriate government agency.

1. Adding Court Order Activation

In order to add a court order activation identified as "YBTEST" to the system 56, the court-ordered call records 62 surveillance system 206 sends a formatted e-mail addressed to a predefined e-mail account. In some regional markets, for example the Florida markets, the following information can be provided and sent as a formatted e-mail message:

TO: FL,NETENG
SUBJECT: COS
MESSAGE: ADD_COS "c", "f", "a", "s", "st",npa,nxx, "r", "cp"
   where c=court order number
      f=Field Office
      a=agency
      s=start date
      st=stop date npa=area code
nxx=mobile number
r=email address or fax number of recipient
cp=email address or fax number of person to copy In order to activate the court order "YBTEST" for mobile telephone number 561-555-1212 having the following parameters: (1) valid date from Dec. 1, 1999 to Dec. 31, 1999; (2) agency=BMI; (3) field office=BOCA; (4) send a daily report to fax number 561-988-4129; and (5) copy the originator of the court-ordered call records 62 request; the formatted e-mail message would look as follows:

ADD_COS
"YBTEST","BOCA","BMI","Dec. 1, 1999","Dec. 31, 1999",561,5551212,"[FAX:NETWORK@561988 4129]","ORIGINATOR"

In one embodiment, once the FORMATTED e-mail MESSAGE is received by FL,NETENG, it is processed by a computer software program called master.dbo.ADD_COS. A system stored software program SCHEDULED TASK can be called every two minutes to check for mail with the subject of "COS." The scheduled task is called "Process Mail." Once received, the stored software program in the message line is executed on the data that is provided within the e-mail message. In one embodiment of the method, the process ADD_COS loads the data into a table 100 called AMA.dbo.COS. This table 100 is used to track when the court order was added to the system 206, what the mobile area code (NPA) is and what the mobile number (NXX) is, what the start and stop dates of the court order are and some status information as it relates to the court order and how many facsimile transmission attempts there have been, if applicable.

2. Deleting or Changing a Court-Ordered Request for Call Records

In one embodiment of the method, to delete a court-ordered request for call records 62, the user can change the "stop date" to an expired date. For example, to delete or change a court-ordered request for call records 62 the user can send a formatted e-mail message as follows:

Send an e-mail to: FL,NETENG with the subject line as COS and the message line as CHANGE CHANGE-_COS "c","f","a","s","st",npa,nxx,"r","cp"
where c=court order number
f=Field Office
a=agency
s=start date
st=stop date
npa=area code
nxx=mobile number
r=email address or fax number of recipient
cp=email address or fax number of person to copy In one embodiment, in order to change the mobile telephone number of the above-added court order, the message would look as follows:

ADD_COS
"YBTEST","BOCA","BMI","Dec. 1, 1999","Dec. 31, 1999",561,5559999,"[FAX:NETWORK@561988 4129]","ORIGINATOR"

Once the formatted e-mail message is received by the recipient FL,NETENG, it is processed by a software program called master.dbo.CHANGE_COS. Again, a system software program can be called, for example, every two minutes to check for e-mail with the subject of "COS." As discussed above, this scheduled task is called "Process Mail." Once received, instructions associated with the software program in the message line are executed according to the data provided within the e-mail message. A computer software program CHANGE_COS can be used to modify the data in a table 100 called AMA.dbo.COS. Any information except the actual court order number can be modified.

3. Automated Record Collection

In one embodiment, each morning at 1:00 am, for example, a scheduled task computer software program called "COS Record Processing" can be executed by the surveillance system 206. This program queries the distributed database management system 56 for any telephone call records 62 collected for the telecommunication device number defined within the request for call records 62. These call records 62 are then copied to a dedicated table 100 (COS RECORDS). From the COS RECORDS table 100 another query can be issued such that only the call records 62 between the start and stop dates of the current court-ordered requests are provided. These call records 62 are then sent by way of facsimile transmission to the individual identified or defined in the AMA.dbo.COS table 100, the originator for example.

A scheduled task computer software program (COS Fax Result Processing) can be executed each hour on the hour, for example. Its purpose is to read e-mail messages showing the status of each facsimile that has been sent by the system 206 to determine if it was sent successfully. This task will set the "deliveryfax" field of the AMA.dbo.COS table 100 to "SENT" or "FAIL" depending on the results of the facsimile transmission. Another scheduled computer software program (COS Fax Resend) is run each hour on the half hour, for example, to resend any failed facsimile transmissions. Once the facsimile has been resent its "deliveryfax" field is set to "IP" (in progress). Both of these scheduled programs can be executed from 6AM until noon daily.

4. Automated Reports

Automated reports can be generated from the scheduled task computer software program "COS Status Report", the instructions associated therewith, which can be executed, for example, at 8am and Noon. This report provides a list of active court orders as well as the status of the corresponding records delivered by way of facsimile transmission.

5. Example Facsimile

One example of a facsimile that is transmitted by the system 206 is discussed below.

_CALL RECORDS FOR 954 5620001_

Initial Cell and Last Cell=cccccrrr where ccc=cell number

Duration=mmmmss.t where m=minutes, s=seconds, t=tenths of a second

| | | |
|---|---|---|
| TYPE: Originating | | |
| NPA: | 954 | NXX: 5620001 |
| Voice Channel Seizure Stamp: | Dec 13 1999 7:34 AM | |
| Answer Stamp: | Dec 13 1999 7:34 AM | |
| Dialed NPA: | 561 | |
| Dialed NXX: | 9953900 | |
| Initial Cell: | 71093 | |
| Last Cell: | 6132 | |
| DURATION: | 4547 | |

6. Example Report

One example of a report that can be generated by the system 206 is discussed below.

Any failed facsimiles will be re-sent hourly (from 6 am to Noon) until it is successfully sent.

| Court Order Number Expiration Fax | | NXX | Added | | Start |
|---|---|---|---|---|---|
| 001C14 03/12/00 | SENT | 3089009 | Jan 18 2000 | 6:14 PM | 01/12/00 |
| 001C20 03/10/00 | SENT | 3233726 | Jan 19 2000 | 10:20 AM | 01/10/00 |
| 001C21 03/10/00 | SENT | 4983638 | Jan 20 2000 | 8:58 AM | 01/10/00 |

Those skilled in the art will recognize that the above methods and reports are merely example implementations. Accordingly, the specific embodiments discussed above should be viewed as examples and not as limiting the scope of the invention.

D. Obtaining Real-Time Information Associated with a Cellular Telephone Network

Figure 12:
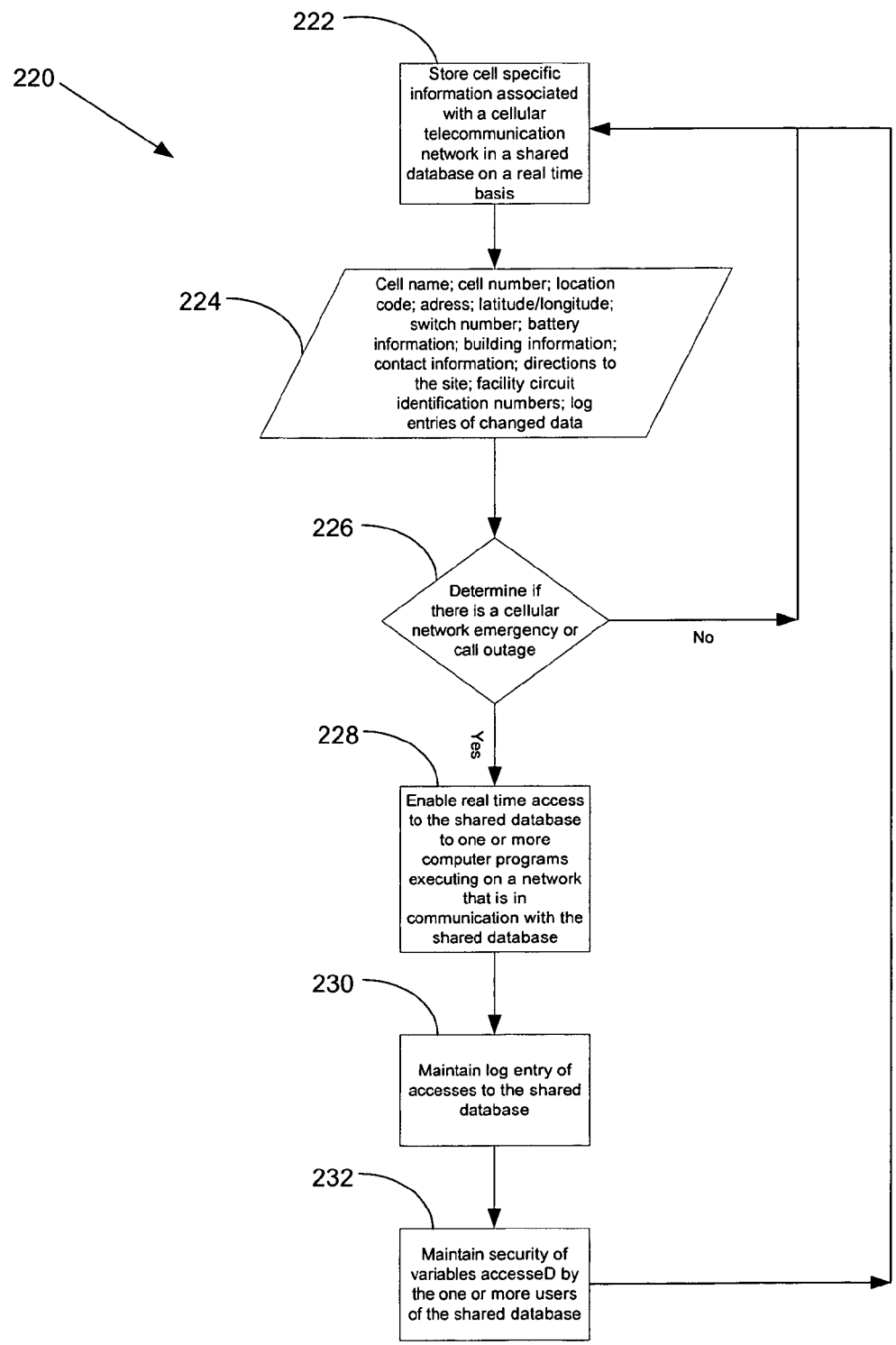
FIG. 12 illustrates one embodiment of a logic flow diagram for obtaining information associated with a telecommunication system.

Referring now to FIG. 12, where one embodiment of a logic flow diagram 220 for obtaining real-time information associated with a telecommunication network 25 is illustrated in block diagram form. At block 222, cell site 86 specific information associated with a telecommunication network 25 is stored in a shared database 22 on a real-time basis. For example, at block 224, a list of the type of cell site 86 specific information is listed. The cell site 86 specific information illustrated in block 224 includes the cell name, the cell number, the location code, the address, the latitude/longitude, the switch number, the battery information, the building information, the contact information, directions to the site, the facility circuit identification numbers and log entries of any changed data, for example.

Once the information enumerated in block 224 is stored in the shared database 22 as indicated in block 222, at decision block 226 a determination is made as to whether there exists across the telecommunication network 25 an emergency or a call outage. If there is no emergency or call outage, the program will continue to store any new cell site 86 specific information associated with the telecommunication network 25. If, at block 226, it is determined that there is an emergency or call outage, at block 228 the system 56 enables real-time access to the shared database 22 thereby allowing one or more computer programs 20 that are executing on the system 56. At block 230, the system 56 maintains a log entry of any accesses that are made to the shared databases 22 by the various computer programs 20. At block 232, as variables are accessed by the one or more users of the shared database 22, a certain level of security is maintained by the system 56.

One embodiment of the distributed database management system 56 can provide a user with several items of information. For example, the user can be provided with real-time information associated with a telecommunication network such as: cell name, cell number, location code, address, latitude/longitude, switch number, battery information (e.g., type, manufacturer, model) for all strings, building information (e.g., building and tower type, gate codes, generator information), contact information (e.g., fire, police, landlord etc.), directions to the site, facility circuit identification numbers and log entries for audits of changed data. In one embodiment, the user can be provided with emergency data associated with the telecommunication network.

Various entities such as people, groups and departments within a company generally maintain information relating to their specific business area in their own spreadsheets and databases. In order to consolidate the information from these various entities, a common database 22 is provided for storing the information from the various entities. Once the information is stored in a common database 22, it can be made available to users associated with the various entities as well as to various other computer software programs 20 residing on the system 56. Accordingly, a software program that is executing somewhere on the system 56 will automatically pick up information that would normally be stored in separate, inaccessible, storage devices associated with each entity. For example, if the user enters an address into the system 56, the computer software programs will automatically pick up that address on a real-time basis. In addition, providing a common database 22 allows the system 56 to maintain a certain level of security. For example, users that are responsible for an address will still be able to access that address without other users overriding their settings.

If the user selects cell numbering, a cell number will be provided. Furthermore, the user can look for a particular site by selecting that option or clicking on an icon displayed on a system 56 output device. Accordingly, the system 56 will provide the user with the name of the cell site, the number of the cell site, the location code of the cell site, the last time the code was modified, the company number, the switch 58 that the cell site is located in, who the responsible field engineer is, address, city, state, zip, latitude, longitude and the facility information associated with that cell site. Those skilled in the art will appreciate that "facilities" are provided to make a connection between the cell site and the switch 58 for various data links, such that the switch 58 can communicate with the cell site 86. Moreover, the system will provide the user with information that can be retrieved from other computer software programs 20, for example a facility management program. Those skilled in the art will appreciate that the above list is not exhaustive and should not be considered as limiting the invention. Those skilled in the art will appreciate that the information can be initially populated in a table 100 from a common table 100 that is shared by all the computer software programs throughout the system 56.

For example, if the user selects to review generator or battery information of a particular cell site 86, the system 56 will provide the user with information associated with the generator and the battery. One embodiment of the system 56 provides the user with a string for identifying a 24-volt battery which includes the battery type, the battery manufacturer, the battery model number, the number of active cells there are and where they are physically located. The same information can be provided in a string for identifying a 48-volt battery.

If the user selects to review building information of a particular cell site 86, the system will provide the telephone information, the building type, the company number, the tower type, whether there is a gate at the tower, the gate key, if there is a gate key, and if there is, whether there is a gate code. In addition, the system can provide different types of information about the generator, fuel loads and the like.

If the user selects to review contact information relating to a particular cell site 86, the system will provide police, fire, water, Federal Aviation Administration (FAA), gas company, landlord and electric company contact information, the meter number, the account and various other pieces of contact information. In addition, the system can provide the name of the RF Engineer, the name of the Cell Manager and the like. In addition, the system provides logging and tracking of data associated with a particular cell site 86 in case there is ever a need to roll back the data. Moreover, a complete history of a particular cell site 86 can be provided to the user. The information discussed above is by no means exhaustive. For example, the system can provide additional pieces of information associated with a particular cell site 86 such as maintenance of routine history, the last time the generator was run, the last time the generator was inspected, when the warranty will expire and the like. Therefore, from one software program 20, the user can obtain a variety of information about a particular site.

The system 56 also provides information associated with telecommunication facilities that go from the switch 58 to the cell site 86 for the data links so that they can communicate with each other. In addition, the system 56 provides information about telecommunication facilities that actually pass through the cell site 86 or another site in the telecommunication system 25. With respect to any one of the telecommunication facilities, for example microwave facilities, the user can identify by the numbers any telecommunication facilities that pass through, terminate or originate at a particular cell site 86. The user also can be provided with a map of the state and will be able to zoom in and see all of the telecommunication facilities on the screen of the output device. The user can then access these facilities by clicking on the respective icons or images displayed on the output device.

The user can select a built-in query generator. Accordingly, the system provides the user with all the information associated with the query value. For example, if the user queries the system 56 for cell sites 86 where the field engineer meets certain criteria, the system 56 will provide the user with a list of all the current field engineers as well as those who have left or have gone to different cities, but are still maintained in the database 22.

The system also provides reports. For example, referring to a cell site 86, the system will print a report of a majority of the information associated with that particular cell site 86 and place it into one form. The report provides the user with values such as the cell location, the field engineer, the building information, the generator information and the like. In order to print the reports, the output can be directed to print the report to the screen, a printer or plotter depending on which output device happens to be selected by the user.

Also, the system provides the telecommunication facility identification numbers and a variety of other miscellaneous information. The user can access this information either on a per cell site basis or the user can print them all at one time. Those skilled in the art will appreciate that all of the information described above is available to the user on a real-time basis. For example, another software program that is being executed on the system will be able to identify any changes that are made in the database 22 on a real-time basis.

E. Tracking the Deployment of Cellular Telephone Network Sites in Real-Time

One embodiment of the system, method and apparatus for obtaining real-time information associated with the deployment of cellular telecommunication network sites. The system, method and apparatus provide a user with information regarding the deployment of cellular telecommunication network sites across a geographic region on a real-time basis.

Generally, one or more users are provided with up to date, real-time project information that would otherwise not be available to them. With related art systems, methods and apparatuses the one or more users would generally meet in person in order to discuss changes to be implemented in a cellular telecommunication network site deployment project, but at the meeting they would not have up-to-date real-time information regarding the cellular telecommunication network site deployment project status. Also, team members of other groups would not necessarily know or have up to date information of the progress being made on a particular project by another group. One embodiment of the real-time software program provides the one or more users with the means for inputting information in a common database 22 and executing one or computer software programs 20 for tracking changes, progress and performance of a specified cellular telecommunication network site deployment project on a real-time basis.

Although there are commercially available project management computer software programs, for example MICROSOFT PROJECT TM, such programs have shortcomings. The MICROSOFT PROJECT TM software program, for example, does not provide the necessary features that are required for tracking the deployment of cellular telephone network sites on a real-time basis. For example, there are various features of the deployment process described below such as the ability of interacting by way of e-mail messaging and providing information on a real-time basis such that when a user invokes the deployment software program and looks at a particular date, the user will know that the information is being provided on a real-time basis and is up-to-date.

The deployment project software program described herein reduces the amount of time required for tracking the progress of new cellular telecommunication network site deployments, as well as tracking the progress of any changes being made to existing cellular telecommunication network sites. One embodiment of the deployment project software program provides a computer software program for tracking changes to deployment project timelines through the use of color-coding and providing summary level information about the deployment project to the user. The deployment software program is capable of managing changes to the deployment in a dynamic way. Accordingly, the computer software program provides instant, real-time access, to date changes within the project plan, who made those changes and when the changes were made.

One embodiment includes a feature providing color-coding to indicate at a glance when project parameters have been modified from a previous setting. For example, dates that are modified from a previous reset or modification may be shown to the user in several different colors. Dates that have been pulled in (e.g., the project task has been shortened) can be shown in green. Dates that have been pushed out (e.g., the project task has been lengthened) can be shown in red. Dates that have not changed may be shown in black. Those skilled in the art will appreciate that these are but a few examples of a color-coding scheme and should not be considered as a limiting feature of the invention as many color-coding schemes may be employed in order to visually alert the user that a project parameter has been modified without departing from the scope of the invention.

The color-coding scheme provides to the individual users an acknowledgment of date changes, thereby allowing the user to make a quick identification of any new changes that were made to the project plan because the user last glanced at the project plan. The system also provides the user with any prior activity information by merely placing the cursor on the desired field. The system also can provide detailed log entries of any changes showing the field name, the old value, the new value, the time/date stamp and the individual user who made the change. Furthermore, the system also can provide customized reports including a detailed company report showing completed dates and changed dates using shading and highlighted boxes for quick identification, providing user definable date field titles in all tracking modules and user definable filters. Moreover, the system also can automatically provide priority renumbering upon changes in project priority; automatically sending e-mail messages upon dates being marked completed or changed by a user; automatically populating dates downstream based upon predefined time intervals; and allowing sub-dates that can or cannot be forced prior to the marking of the main completion date.

Another feature provides the capability of tracking the performance of a cellular telecommunication network site and also provides the capability of tracking the performance of any active projects associated therewith. Also, another feature can provide a centrally accessible repository of project data, thereby eliminating the need to keep and maintain individual databases, spreadsheets and the like.

Furthermore, the deployment project software program can track a variety of information regarding to when the information was exchanged. Also, the deployment project software program can provide automatic down streaming, such that if a user changes a date, the program has the ability to automatically change the dates downstream of the modified dates. Moreover, the deployment project software program also can send the user e-mail messages upon the occurrence of a predetermined event associated with the deployment project plan. For example, if a particular date upstream of the current date is changed or the deployment at a particular site is complete, the program sends an e-mail message to the user's e-mail address informing the user that such an event occurred. In addition, rules can be provided in order to prevent certain dates from being marked as being complete. Also, there are certain functions that cannot take place unless other information has been provided to the database 22 in order to keep the database 22 up to date and to ensure that up to date addresses, phone numbers and zip codes are available to the program.

1. The Deployment Process

From the opening screen of the deployment project program, a user can begin managing cellular telecommunication network site projects by creating new deployment sites, changing deployment types and the like. A security layer has been included in the software program to provide users with administrative privileges. For example, a security layer can be added to a peripheral, to a table 100 or on a per user basis such that the system can dictate who is allowed to make certain changes to deployment project parameters. This security feature can be useful because the databases and spreadsheets have been removed from the various individual user groups and have been placed in a centrally accessible repository. With the security feature, individual user groups have the ability of adding information, which is applicable only to specific user groups, and thereby prevent other users from changing that information. Additional administrative functions, such as who belongs to which user group and provisions for hand-generated reports also can be provided.

If given the rights, a user also has the ability of viewing or updating projects, viewing or updating specific cell sites and subsequently editing such projects and cell sites. In addition, the user can have the option of simply viewing the information provided by the deployment project program without updating or editing the information because under the viewing function the user generally cannot make any changes. This feature provides protection and maintains the integrity of the database 22 and allows the user to freely view the information without corrupting the data or programs therein.

One project screen allows a user to define a new project and assign various people to work on the project. The user also is permitted to enter project descriptions into the system and track any dates that the user wants to track on a per project basis. Furthermore, the user is provided with a notes tab where the user can enter project information such as an ongoing history for the site or for a particular project.

In order to view cellular telecommunication network deployments at a specific cell site, a user can click on a software button and display the desired region. For example, if a South Florida region is selected, the switches 58 for South Florida are displayed on the output device 44. Furthermore, if the entire state of Florida is selected, the user can click on the appropriate software button and can view the entire state of Florida rather than just the South Florida region.

One embodiment of the system can provide two different types of views. For example, a user can assign custom titles or the user can use standard titles, which can be selected as the default that are provided with the software program. Also as a default, the system comes up by displaying the current schedule, any claims that are outstanding and open cell sites that have not yet been deployed. The user also has the option of going off the schedule to view the project's history.

In one embodiment, the project dates can be grouped according to specific departments. For example, in one view only the Engineering Department's project dates can be displayed for a user. Likewise, project dates may only be viewed based on deployment type, date, tracking site, coverage site and the like. For example, a user can select to look at a deployment type or the user can select to look at all parameters. In addition, a user can define certain types of deployment projects or certain deployment cell sites that the user may want to look at periodically such as every Friday, for example. The user also can set up custom views so as to avoid looking at information that belongs to other groups or departments. In order to view a project schedule, a user can select view schedule and the system will list every cell site that is currently under deployment.

Furthermore, as discussed above, the deployment program displays schedules with certain color-coding. For example, the color-coding on one side of the display can be different than the color-coding on the other side. Red color codes can indicate that something within the project has changed. The user is generally not provided with the details of what has changed in the project. Rather, the color-coding visually alerts the user that something has changed because that user has last looked at the project schedule. Therefore, the color-coding provides the user with an immediate visual feedback regarding the project status because the last time he or she viewed the schedule.

If the user acknowledges all of the changes to the project that are indicated in red, the next time that user accesses the deployment program, and nothing else has changed, everything will appear in a green color-code. This allows a user, each time they log into the deployment program, to focus only on the project parameters that are color-coded in red, because those are the only items that have changed because the previous log in.

In one embodiment, the color-coding scheme can be implemented on a per user basis such that if one user has not acknowledged certain changes, those changes will still appear on the screen in red while those same parameters will appear in green on another user's screen who has acknowledged the changes. Accordingly, every user logged into the system can track the performance of the same project and its status somewhat independently of the other users. If the color on one side of the screen is blue, then that particular date is the same as originally populated. If it is red, then that particular date has been pushed out (e.g., lengthened). If it is green, then that particular date has been pulled in (e.g., shortened).

A user can also sort project parameters on any columns by clicking on the heading and getting a detailed view. The user can accomplish this by either clicking on the edit button or by clicking on any of the appropriate icons displayed on the screen. The deployment software program will then display all of the different dates according to the user's selection. A plus symbol indicates that additional sub-dates exist for that particular task. In order to look at the sub-dates, the user can click on the plus symbol and thereby break down the sub-dates into a more detailed view.

A user also can be provided with additional information by the program. For example, a user can view or access the cell tower heights, prioritize particular cells, assign a project manager, assign a field engineer, assign an operations manager, assign a real estate manager and the like. A user also can set up rules for final inspection or marking a particular task as being completed.

The deployment software program can perform automatic down streaming to allow the various users to define specific time intervals. For example, automatic down streaming would apply if someone changes a construction start date by a number of days. Accordingly, the deployment software program will automatically populate and search the number of days beyond the original date and step through the entire table 100. In turn, everyone will know the proper intervals in which to accomplish his or her tasks.

In final system design, if a user changes a date or marks it being completed, the user can change the project's date of completion to occur in a certain number of days after the system design is completed. That way, if the system design date gets pulled in or pushed out, the project's date automatically get pulled in or pushed out. Those skilled in the art will appreciate that these intervals can be defined on a per-site deployment basis. This can be done, for example, through templates so that for some deployment types the intervals will be different.

In one embodiment, other cell site specific details can be provided by the deployment project program. For example, the system allows the various users to track building and generator information, the manufacturer, power voltage, the type of building and other similar information associated with the project. A user also can display team members that are responsible for certain sites, facilities and other miscellaneous details. All of this information is kept in a detailed log of the project's activities. It also provides the user with the date of the field that was changed, the action done to the particular field, whether the date was pulled in and what the old date was, what the new date is and who actually changed it. Accordingly, the various users will always have a good history of what is happening with any changes made to the project.

The cell site specific details information is valuable, for example, if one user has changed a parameter and another user needs to know why the change was made. Accordingly, the other user can look at the project and view the cell site specific details information in order to find out why the change was made. Even if no notes are entered in the history, the name of the person who made the change will always be provided and the user will thus know who made the changes.

For example, in situations where changes are made to schedules but no reason is documented for the change, a user could go back to the log and ask the previous user who made the changes, and what they were doing on a specific day at a specific time. When provided with this kind of information, the previous user may suddenly remember why they had made the changes to the project on that particular date and it is thus useful to provide such information to the user.

One embodiment of the deployment project software program can provide actual photographic representations or actual images of the individual cell sites. The deployment project software program can provide e-mail messaging functionality. For example, a user that is responsible for an initial design plan will not start on the design until the user knows that a property has been acquired. Rather than force the user to constantly monitor this cell site, the user can set up the deployment project software program such that whenever the property is acquired and the change is detected, that particular task is marked completed or changed. Accordingly, the deployment project software program will then send that user an e-mail message thereby informing the user that the acquisition of the property is completed and that the user may now begin with the design task. With the e-mail messaging capability, a user can actually perform all of the user's project tasks without logging into the deployment project software program until receiving an e-mail notification that makes it necessary for the user to log-in. The e-mail messaging functionality can be triggered on the basis of dates, which are marked as being completed, or on dates that have been edited. E-mail messaging also is useful if the user wishes to be alerted whenever another user pushes out a date that will in some way affect the user's other tasks. For example, for planning purposes, a user may wish to know that another user is pushing out a date, but the user does not want to constantly log into the deployment process in order to find out.

One embodiment of the deployment project program can automatically provide information for populating other computer software programs or processes with deployment information. For example, the users' project time sheets can be verified for the proper number of hours to ensure that time has not been charged against non-existing codes or codes that have been closed and then provide that information to conventional spreadsheet programs.

One embodiment of the deployment program can provide report tables 100 to an output device. The report tables 100 can include certain generic fields that may be desired on every report. The reports also can include various visual aids to alert the user at a glance of certain characteristics of the data portrayed in the report. In one example, the dates on the report can be shaded to indicate that the date has been marked as being complete. In one example, the date can be surrounded by a box to indicate that the date has been changed because a prior deployment. If a date has both shading and a box around it, the date has been changed but is now complete. Those skilled in the art will appreciate, that these aids are provided such that the user can easily recognize them at a glance and other aids may be substituted without departing from the scope of the invention.

In use, the deployment software program can be executed as needed by the users or deployment project team members in order to track the progress of various deployment projects. Once a deployment team meets, it can, for example, reset all of the flags and the project parameters such that all entries appear in black instead of red or green and thereby remove the color-coding and the users will essentially be starting out with a fresh screen.

In one embodiment, the user can perform site administration from a screen that is provided for managing various deployment sites. The user can add a new cell site by entering the geographic market that the cell site is located in. For example, the user can enter new sites in South Florida, West Florida and other cities. Those skilled in the art will appreciate that the software program can display more than one site on one server. In addition to the site, the program requires that the user enter a cell name. However, at this time the cell number or the switch number is not required because the user may not actually know what those numbers are. Also, if required by the particular site, a priority can be entered at this time. If a priority is not provided, the user can assign it the highest priority number. In addition, the program can prompt the user to enter the name of the equipment engineer, the type of deployment, the name of the facility engineer and, optionally, any project budget information.

In addition, the user can assign the same cell site more than once. For example, the user can access a site candidate list in order to select the new site from a primary site and a number of secondary sites. For example, based on the property that has been acquired for the site, multiple sites can be assigned in parallel. Accordingly, when one of those sites first becomes available, or turns out to be the best choice, it will be selected and the others will be dropped.

The user also can perform additional administrative functions and has the ability to view various tables 100. For example, the user can view a building table 100, which defines the type of buildings that are currently being utilized at the deployment sites. The user can also view an employee table 100 to see which employees have been assigned to the project, their identification numbers, and the like. In one embodiment, a master administrator can be assigned to each deployment project and several other administrators can be assigned below the masters. In other words, several different levels of administrative privileges can be assigned.

A user also has the capability of adding security functions. For example, fields can be added where the user can assign a group and individuals that are part of that group. For example, in one table 100 the user can enter the name, number and building type and all of the fields that a particular user has access to will be displayed on the screen and the user can find out who has permission to change which fields on a per table 100 basis. The user also can specify who belongs to the various groups, which fields are available to a specific group and which fields within the group are available to the individual. The user can define the group and the members of the group. Also, for security reasons, the user can automatically import information into the deployment software program from another software program, e.g., a spreadsheet. The information can include any new information being created such as a new market reference.

One embodiment of the invention can be implemented using visual basic and DB6, for example. Referring to FIG. 1, a user is assigned to a workstation 26, which is in communication with an application server 12 and a shared server 14. One difference between the application server 12 and the shared server 14 is that the application server 12 is, generally, a "read only" server, while information can be written to and read from by the shared server 14. When the user executes instructions associated with a primary software program, for example the distributed data information system 10 including one or more locally developed computer software programs 20 using a common database 22, the user first accesses the application server 12. Then, the individual software program grants access to the current deployment project when it executes and communicates with the shared server 14. This provides the capability of allowing the various users to utilize attachments. In order to use attachments, the deployment project program needs to be able to write to the shared server 14 and to make that information available to all users within a particular region or state.

Accordingly, in one embodiment, the deployment project program begins by accessing the application server 14 and then accessing the database server 16, an SQL database server for example. The deployment project software program provided by the application server 12 then communicates with the SQL database server 16 and the shared server 14 and all of the instructions associated with the deployment project software program are retrieved from the application server 12. Each one of the software programs can either have a table 100 stored in the application server 12 or they may have an initialization file associated therewith that directs the main program. Normally, the main program reads the initialization file first to determine which servers are available for its access.

2. Example Deployment Operation

One embodiment of the deployment software program is selected from a menu screen of the shared server 14 of the distributed information system 10. This includes one or more locally developed computer software programs 20 using a common database 22, as discussed above. The user then highlights the menu item corresponding to the region the user wants to work with and displays a dropdown menu. "DEPLOYMENT" is then selected from the menu list and the user clicks the mouse button to start the DEPLOYMENT program. The DEPLOYMENT welcome screen then appears. Subsequently, the DEPLOYMENT main menu is displayed. Some of the buttons on the DEPLOYMENT menu may be disabled; this is normal as certain features are reserved for the administrator.

The Schedule Detail screen provides a number of sub-dates and the ability to add additional supplementary data items to both main and sub-dates. A user-interface is provided to allow users with administrative access privileges to add both sub-dates and supplementary date detail items. To display the Schedule Detail screen, the user clicks either the View Sites or Update Sites button. If the user plans to make changes to the Schedule Detail, the Update Sites is selected; otherwise the user can click the View Sites button. Both choices will cause the Schedule Query screen to appear.

The Schedule Query screen contains several sections that can be displayed by clicking the appropriate tab near the top of the form displayed on the output screen. Initially, the Options tab will be displayed allowing the user to select a subset of all available deployment sites. The user then checks the desired Groups and Deployment Types by clicking in the desired box and then to view the selection, the user clicks the OK button. Alternatively, the user can click the tab labeled Schedule. The user can further qualify the deployment sites shown in a subsequent query screen by selecting Default Titles or Custom Titles. Furthermore, the user can choose View Current Schedule to view sites currently being managed by the DEPLOYMENT program. Alternatively, to view sites that have completed the deployment project the user selects View Off Schedule.

The user selects the Deployment Schedule Query after having completed the Options selections by clicking OK in order to proceed to the Schedule Query results tab. DEPLOYMENT will display all the sites that fit the previous selected options. The user may also sort the table 100 according to any column by double-clicking that column's heading either in ascending or descending order by selecting the Sort Ascending or Sort Descending buttons as desired.

The user also may display the deployment schedule for a particular cell site by double-clicking the row containing that site. Accordingly, DEPLOYMENT will load the selected cell site and proceed to the Deployment Schedule Detail screen.

The Deployment Schedule Detail screen displays the Schedule Detail form that contains most of the features associated with the DEPLOYMENT software program. If the user desires to view a larger section of the deployment schedule, the user can vertically resize the window. Some buttons along the bottom of the form perform the following functions:

Rules: This appears if the user has administrator access and allows the user to add or change the date validation rules. These rules should be satisfied in order to mark a task as being complete on a certain date.

New Subdate: This appears if the user has administrator access and allows the user to create a sub date associated with the highlighted main date.

Date Details: This button takes the user to the Date Details dialog, allowing the user to enter items of information associated with the highlighted main date or sub date. Furthermore, if the user has administrative access, the user can define new items of information that support the schedule date in question.

Expand All allows the user to view additional dates and text detail which are sub-dates and detail of a main date. This button is labeled "COLLAPSE," and after being depressed it hides the sub-dates and the details.

When the user attempts to mark a date as complete, DEPLOYMENT performs several validation checks to ensure the integrity of the deployment schedule. It is possible to receive several error messages. For example, the first error message occurs when a required field has not been populated. In another case, the error message advises the user that it is necessary to populate the Site County field before the date in question can be marked complete. In yet another example, the error message advises the user that the required date-details items have been left unpopulated. Still another error message advises the user that a required date detail item has not been entered. Still a further error message advises the user that an attempt has been made to complete a main date that contains a KEY sub date. Accordingly, the user should mark the KEY sub date as being completed. The main date will be marked automatically.

Date details are provided as a way of storing items of information that are not necessarily dates. Furthermore, the date detail items can be associated with a particular main or sub date. The user may view and enter information for date details by clicking the Date Details button. A dialog box will appear. Generally, the date detail includes text; however checkboxes can also be displayed. The user types the text for each information box or checks the box as may be required. Red date details are required and should be populated in order to mark the date or sub date complete. The user has finished entering data, the user can click the Save button to save the date details. The information entered by the user will be transferred to the deployment schedule grid.

The foregoing description of the specific embodiments of the various embodiments of the invention has been presented for the purpose of illustration and description. It is not intended to be exhaustive or to limit the invention to the precise form disclosed. Many modifications and variations are possible in light of the above teaching. It is intended that the scope of the invention be limited not with the description above but rather by the claims appended hereto.

The claimed invention is:

1. A distributed system for providing real-time access to a network organized repository of data, comprising:
 a computing system including one or more computers having one or more processors for executing a first set of program instructions and a first memory for storing the first set of program instructions wherein the one or more computers is in communication with the network; and
 a server, in communication with the computing system, the server having one or more processors for executing a second set of program instructions and a second memory for storing the second set of program instructions, the server being configured to support one or more users and to provide shared access to one or more telecommunication computer software programs, the server being coupled to one or more resources for managing, communicating and the storing of data and the computer software programs;
 wherein, the one or more resources can be accessed and processed by the one or more telecommunication computer software programs;
 wherein a user of the computing system has real-time access to the data and the telecommunication computer software programs and any changes made thereto by one or more other users supported by the server, wherein the user is provided options on the computing system to set thresholds for predetermined network conditions and to specify at least one pager number to thereby cause the generation of wireless pages to the at least one pager number upon the threshold being met;
 wherein further the server is configured to automatically generate a wireless page to the at least one pager number upon an occurrence of at least one of the predetermined network conditions meeting the threshold, wherein the server includes an investigation number in the wireless page and assigns a description of the occurrence of the at least one of the predetermined network conditions meeting the threshold to the investigation number so that entry of the investigation number to the computing system causes display of the description;
 one or more switchmasters coupled to the one or more computers wherein each switchmaster is also in communication with one or more associated telecommunication switches via a data feed link wherein further each of the associated telecommunications switches receive call records from a plurality of user telecommunications devices; and,
 an electronic control processor in communication with one or more of the telecommunications switches to control the call record flow through the switches to the associated switchmaster and monitor any call processing failure records forwarded from the telecommunications devices.

2. The system according to claim 1, wherein the server includes a structured query language server.

3. The system according to claim 1, wherein the one or more telecommunication computer software programs are associated with managing a telecommunication network.

4. The system according to claim 3, wherein the telecommunication network includes a wireless telecommunication network.

5. The system according to claim 1, wherein the computing system includes a plurality of computers interconnected as a network.

6. The system according to claim 1, further comprising an application server in communication with the computing system, the application server having one or more processors for executing instructions associated therewith, a memory for storing the instructions, and one or more resources for managing, communicating and storing data, wherein the application server stores one or more telecommunication computer software programs and provides access to the one or more telecommunication computer software programs stored therein to the computing system upon the computing system querying the application server.

7. The system according to claim 1, wherein the server includes a shared server.

8. A method of providing real-time access to a network organized repository of data, comprising:
 providing access to one or more telecommunication computer software programs to a computer, the computer having one or more processors for executing instructions associated with the one or more telecommunication computer software programs and a memory for storing the instructions, and wherein providing access includes allowing a threshold for a wireless page to be set for a predetermined network condition;
 communicating to a server with the computer, the server having one or more processors for executing instructions associated therewith and a memory for storing the instructions, the server being configured to support one or more users and to provide shared access to the one or more telecommunication computer software programs, the server being coupled to one or more resources for managing, communicating and storing data and the one or more telecommunication computer software programs, the server being configured to detect the threshold being met for the predetermined network condition and to assign an investigation number to a description of the predetermined network condition meeting the threshold;
 storing the data within a switchmaster buffer wherein the switchmaster is coupled to the computer, wherein each switchmaster is also in communication with one or more associated telecommunication switches via a data feed communication link, wherein further each of the associated telecommunications switches receives the data from a plurality of user telecommunications devices;
 controlling the flow of the data through the switches to the associated switchmaster via an electronic control processor in communication with one or more of the telecommunications switches;
 providing a user of the computer with real-time access to the data and the telecommunication computer software programs and any changes made thereto by one or more other users supported by the server;
 automatically generating a wireless page from the server upon an occurrence of a predetermined network condition meeting the threshold wherein the page includes the investigation number; and
 upon receiving a response to the page wherein the response includes the investigation number and upon entering the investigation number into the computer, displaying the description.

9. The method according to claim 8, wherein providing access to the one or more telecommunication computer software programs includes providing access to one or more programs related to the managing of a telecommunication network.

10. The method according to claim 8, wherein providing access to the one or more telecommunication computer software programs includes providing access to one or more applications related to managing data associated with a telecommunication network.

11. The method according to claim 10, wherein the telecommunication network is a wireless telecommunication network.

12. The method according to claim 8, wherein providing access to a computer includes providing access to a plurality of computers interconnected as a network.

13. The method according to claim 8, further comprising providing access to an application server, the application server in communication with the computer, the application server having one or more processors that execute instructions associated with the application server, a memory for storing the instructions, and one or more resources for the management, communication and the storage of data, wherein the application server stores one or more telecommunication computer software programs stored therein and provides access to the one or more applications to the computer upon the computer querying the application server.

14. The method according to claim 8, wherein providing access to the server includes providing access to a shared server.

15. A computer readable medium having a set of computer instructions encoded thereon, comprising:
 the set of computer instructions being operative with a computer to:
  provide access to one or more telecommunication computer software programs to the computer, the computer having one or more processors that execute instructions associated with one or more telecommunication computer software programs and a memory for storing the instructions, and wherein providing access includes allowing a threshold for a wireless page to be set for a predetermined network condition;
  provide communication with a server, the server having one or more processors for executing instructions associated with the server and a memory for storing the instructions, the server being configured to support one or more users and to provide shared access to the one or more telecommunication computer software programs, the server being coupled to one or more resources for the management, communication and the storage of data that is accessed and processed by the one or more telecommunication computer software programs, the server being configured to detect the threshold being met for the predetermined network condition and to assign an investigation number to a description of the predetermined network condition meeting the threshold, wherein the data is temporarily stored within a buffer internal to the switchmaster and in communication with the computer, wherein each switchmaster is also in communication with one or more associated telecommunication switches via a data feed communication link, wherein further each of the associated telecommunications switches receives the data from a plurality of user telecommunications devices;
  provide a user of the computer with real-time access to the data persistently stored within the resources and any changes made to the data by any other one or more users supported by the server;

automatically generate a wireless page from the server upon an occurrence of a predetermined network condition meeting the threshold wherein the page includes the investigation number; and upon receiving a response to the page wherein the response includes the investigation number and upon entering the investigation number into the computer, display the description.

16. A distributed system for providing real-time access to a network organized repository of data, comprising:

a first computing means including one or more means for executing a first set of program instructions and a first means for storing the first set of program instructions; and a second computing means for executing a second set of program instructions and a second means for storing the second set of program instructions, in communication with the first computing means, the second computing means being configured for supporting one or more users and for providing shared access to one or more telecommunication computer software programs, the second computing means being coupled to one or more resources for managing, communicating and the storing data and the computer software programs;

wherein, the resources can be accessed and processed by the one or more telecommunication computer software programs, wherein, prior to being persistently stored within the resources, the data is temporarily stored within a switchmaster in communication with the resources, each switchmaster being also in communication with one or more associated telecommunication switches via a data feed communication link, wherein each of the associated telecommunications switches receives the data from a plurality of user telecommunications devices;

wherein a user of the first computing means has real-time access to the data and the telecommunication computer software programs and any changes made thereto by one or more other users supported by the second computing means, wherein the user is provided options on the computing system to set thresholds for predetermined network conditions and to specify at least one pager number to thereby cause the generation of wireless pages to the at least one pager number upon the threshold being met, wherein the second computing means is configured to automatically establish a generate a wireless page to the at least one pager number upon an occurrence of at least one of the predetermined network conditions meeting the threshold, wherein the second computing means includes an investigation number, other than a telephone number, in the wireless page and assigns a description of the occurrence of the at least one of the predetermined network conditions meeting the threshold to the investigation number so that entry of the investigation number to the computing system causes display of the description.

17. The system according to claim 16, wherein the second computing means includes a structured query language server.

18. The system according to claim 16, wherein the one or more telecommunication computer software programs are associated with managing a telecommunication network.

19. The system according to claim 18, wherein the telecommunication network includes a wireless telecommunication network.

20. The system according to claim 16, wherein the first computing means includes a plurality of computers interconnected as a network.

21. The system according to claim 16, further comprising an third computing means for executing instructions associated therewith in communication with the first computing means, a third means for storing the instructions, and one or more means for managing, communicating and storing data, wherein the third computing means stores one or more telecommunication computer software programs and provides access to the one or more telecommunication computer software programs stored therein to the first computing means upon the first computing means querying the third computing means.

22. The system according to claim 16, wherein the second computing means includes a shared server.

23. A method of providing real-time access to a network organized repository of data, comprising the steps of:

providing access to one or more telecommunication computer software programs to a first computer means for executing a first set of instructions associated with the one or more telecommunication computer software programs and first storing means for storing the first set of instructions, and wherein providing access includes allowing a threshold for a wireless page to be set for a predetermined network condition;

communicating to a second computer means for executing a second set of instructions associated therewith and a second storing means for storing the second set of instructions, the second computer means being configured for supporting one or more users and for providing shared access to the one or more telecommunication computer software programs, the second computer means being coupled to one or more resources for managing, communicating and storing data and the one or more telecommunication computer software programs, the second computer means being configured to detect the threshold being met for the predetermined network condition and to assign an investigation number to a description of the predetermined network condition meeting the threshold;

storing the data within a switchmaster buffer wherein the switchmaster is coupled to the second communication means, wherein each switchmaster is also in communication with one or more associated telecommunication switches via a data feed communication link, wherein further each of the associated telecommunications switches receives the data from a plurality of user telecommunications devices;

controlling the flow of the data through the switches to the associated switchmaster via an electronic control processor in communication with one or more of the telecommunications switches;

providing a user of the first computer means with real-time access to the data and the telecommunication computer software programs and any changes made thereto by one or more other users supported by the second computer means;

automatically generating a wireless page from the second computing means upon an occurrence of a predetermined network condition meeting the threshold wherein the page includes the investigation number; and upon receiving a response to the page wherein the response includes the investigation number and upon entering the investigation number into the computer, displaying the description.

24. The method according to claim 23, wherein providing access to the one or more telecommunication computer software programs includes providing access to one or more programs related to the managing a telecommunication network.

25. The method according to claim 23, wherein providing access to the one or more telecommunication computer software programs includes providing access to one or more applications related to managing data associated with a telecommunication network.

26. The method according to claim 25, wherein the telecommunication network is a wireless telecommunication network.

27. The method according to claim 23, wherein providing access to a computer means includes providing access to a plurality of computer means interconnected as a network.

28. The method according to claim 23, further comprising providing access to a third computer means for executing a third set of instructions associated with the application server in communication with the first computer means, a third storing means for storing the third set of instructions, and one or more resources for the management, communication and the storage of data, wherein the application server stores one or more telecommunication computer software programs stored therein and provides access to the one or more applications to the first computer means upon querying the second computer means.

29. The method according to claim 23, wherein providing access to the second computer means includes providing access to a shared server.

* * * * *